(12) United States Patent
Ditya

(10) Patent No.: US 9,300,574 B2
(45) Date of Patent: Mar. 29, 2016

(54) LINK AGGREGATION EMULATION FOR VIRTUAL NICS IN A CLUSTER SERVER

(71) Applicant: Vikrama Ditya, Pleasanton, CA (US)

(72) Inventor: Vikrama Ditya, Pleasanton, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 135 days.

(21) Appl. No.: 13/731,316

(22) Filed: Dec. 31, 2012

(65) Prior Publication Data

US 2014/0185627 A1    Jul. 3, 2014

(51) Int. Cl.
*H04L 12/28* (2006.01)
*H04L 12/721* (2013.01)
*H04L 12/709* (2013.01)
*H04L 12/931* (2013.01)

(52) U.S. Cl.
CPC .............. *H04L 45/44* (2013.01); *H04L 45/245* (2013.01); *H04L 49/356* (2013.01); *Y02B 60/33* (2013.01)

(58) Field of Classification Search
CPC ...................................................... H04L 45/44
USPC ........................................................ 370/409
See application file for complete search history.

(56) References Cited

U.S. PATENT DOCUMENTS

| | | | |
|---|---|---|---|
| 7,925,802 B2 | 4/2011 | Lauterbach et al. | |
| 8,140,719 B2 | 3/2012 | Lauterbach et al. | |
| 8,762,125 B2 * | 6/2014 | Errickson et al. | ............... 703/23 |
| 2006/0224659 A1 * | 10/2006 | Yu | .................. 709/201 |
| 2008/0031263 A1 | 2/2008 | Ervin et al. | |
| 2009/0232152 A1 | 9/2009 | Chen | |
| 2010/0020680 A1 | 1/2010 | Salam et al. | |
| 2011/0075554 A1 * | 3/2011 | Holness | ........................ 370/228 |
| 2011/0292948 A1 | 12/2011 | Delregno | |

OTHER PUBLICATIONS

U.S. Appl. No. 13/731,324, filed Dec. 31, 2012, entitled "Resilient Duplicate Link Aggregation Emulation".
IEEE Standard for Local and Metropolitan Area Networks—Link Aggregation, IEEE Computer Society, Nov. 3, 2008, 1-145, 802.1AX-2008, IEEE, New York.
Frazier, Howard, et al., IEEE 802.3ad Link Aggregation (LAG), IEEE 802.3 HSSG Symposium, Apr. 17, 2007, 1-13, Ottawa.
NFOA mailed Nov. 5, 2014 for U.S. Appl. No. 13/731,324, 30 pages.
Final Office Action mailed Feb. 20, 2015 for U.S. Appl. No. 13/731,324, 28 pages.

* cited by examiner

*Primary Examiner* — Wei Zhao

(57) ABSTRACT

A cluster compute server comprises a fabric interconnect, a first node coupled to the fabric interconnect and comprising a network interface controller coupleable to an external network, and a second node coupled to the fabric interconnect and comprising a fabric interface to provide a set of one or more virtual network interface controllers representing the network interface controller of the first node. The one or more virtual network interface controllers each appear as a local network interface controller to software executed at the second node. The first node is to emulate one or more link aggregation partners for the set of one or more virtual network interface controllers.

17 Claims, 11 Drawing Sheets

LINK AGGREGATION EMULATION FOR VIRTUAL NICS IN A CLUSTER SERVER

CROSS-REFERENCE TO RELATED APPLICATIONS

The present application is related to co-pending U.S. patent application Ser. No. 13/731,324 entitled "RESILIENT DUPLICATE LINK AGGREGATION EMULATION" and filed on even date herewith, the entirety of which is incorporated by reference herein.

BACKGROUND

1. Field of the Disclosure

The present disclosure relates generally to processing systems and more particularly to packet switching in a cluster server.

2. Description of the Related Art

Link aggregation protocols often are employed in networks to aggregate, or bond, multiple point-to-point physical links into a single logical link that can provide improved overall bandwidth and resiliency. Typically, these protocols rely on the exchange of link aggregation messages between the two ports at opposite ends of a point-to-point link in order to establish an aggregated group of links. To initiate link aggregation, a device transmits discovery packets over each of its link-aggregation-enabled ports of interest to determine whether the port at the other end is enabled to support link aggregation. Those links identified as supporting link aggregation at both ends then may be combined into a single logical link over which one or more packet flows may be distributed.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
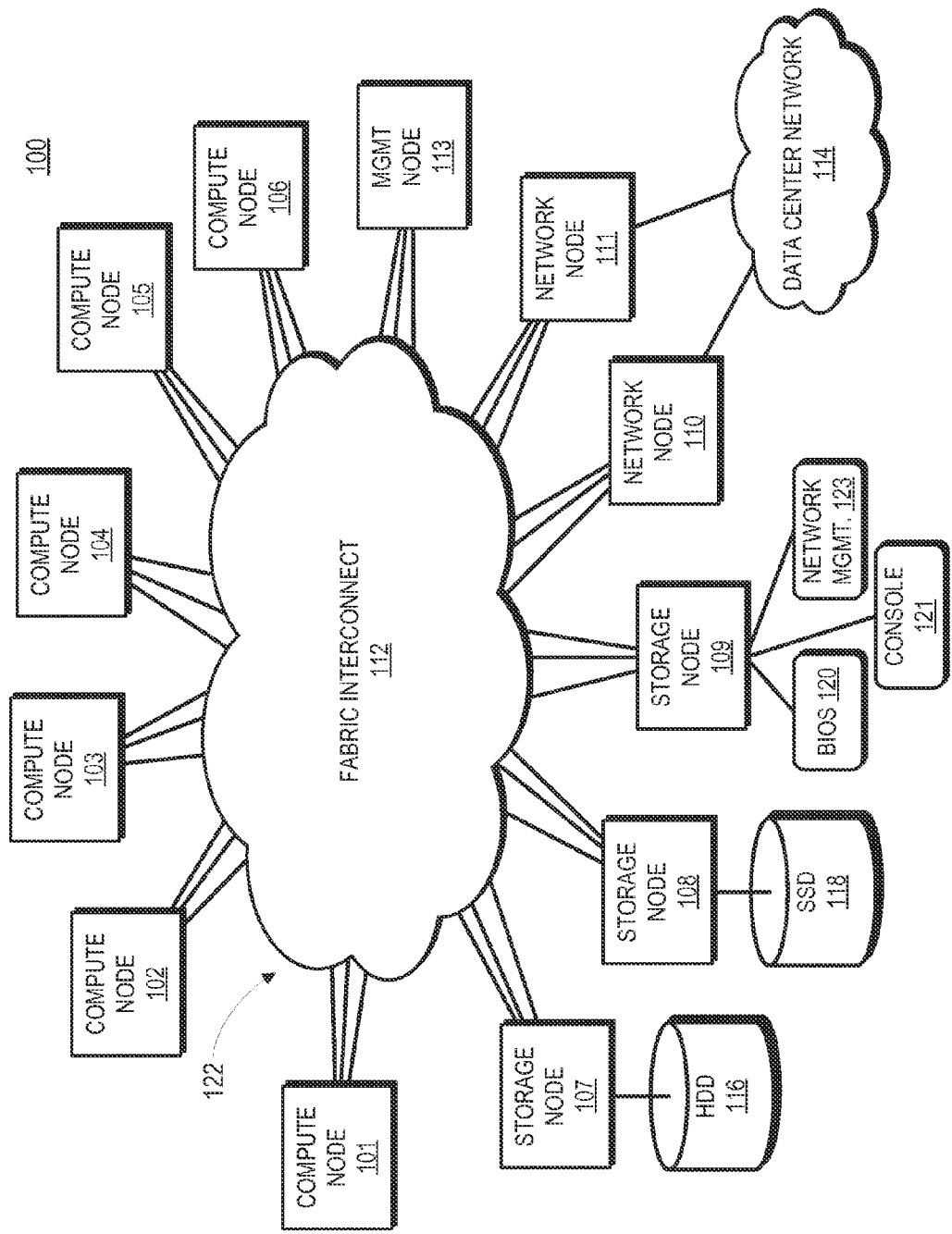
FIG. 1 is a block diagram of a cluster compute server in accordance with some embodiments.

FIGS. 1-14 illustrate techniques for supporting link aggregation in a cluster compute server employing virtual network interface controllers (NICs) at nodes of the server. In some embodiments, the cluster compute server implements a network of nodes, whereby the nodes comprise compute nodes that employ one or more processors to perform compute tasks, peripheral resource nodes that provide certain peripheral resources, such as mass storage devices and network interface controllers connected to one or more external networks, and management nodes that provide network management services for the cluster compute server. Rather than implementing peripheral resources at each compute node, in some embodiments certain peripheral resources are eliminated from the compute node and the cluster compute server virtualizes the peripheral resources of the peripheral resource nodes such that the remote peripheral resources appear as local peripheral resources to the hardware and software processing components of the compute node.

While this virtualized peripheral resource approach can have the advantage of decreased cost and power consumption, the virtualization of the NICs can introduce architectural configurations that cause issues with some frequently-used networking protocols. The Link Aggregation Control Protocol (LACP) and other link aggregation techniques often rely on the exchange of certain link aggregation messages between two sides of a link in order to identify links that are capable of being aggregated, and being so identified, to aggregate the links. As such, these link aggregation techniques typically are limited to the aggregation of physical point-to-point links. Under the NIC virtualization techniques described herein, one or more physical ICs of a remote peripheral resource node may be emulated at a compute node as one or more virtual NICs (VNICs) in a manner that obscures the fact that the actual physical NIC that is processing the incoming and outgoing packets is likely multiple hops away. As such, the compute node and the peripheral resource node providing the NIC resource may not be connected via direct point-to-point links in the cluster compute server architecture described herein.

In certain instances, it is desirable to obscure the underpinnings of the cluster compute server so that the software executing at a compute node operates as though it is executing in a computing system with a full suite of local peripheral resources. To support the transparent virtualization of NIC resources, in some embodiments link-aggregation-related messaging from a compute node attempting to establish a link aggregation group is routed through the fabric of the cluster compute network to one or more network nodes. The network node operates to emulate a link-aggregation-compatible link aggregation partner to the transmitting compute node by responding to link aggregation messages sent via the VNICs of the compute nodes with corresponding reply link aggregation messages as appropriate. To illustrate, in response to a discovery link aggregation message transmitted from the compute node in association with one of the virtualized links of the compute node, the network node can generate a reply link aggregation message that indicates that the "other end" of the virtualized link is enabled for link aggregation, thereby allowing the compute node to bond the virtualized link to other virtualized links to form a link aggregation group (LAG) that the compute node then may use as a single logical link for packet transmission and reception. Similarly, for a virtualized link so bonded, the network node can periodically transmit "keep-alive" link aggregation messages as specified by LACP and other standard link aggregation protocols, which generally require periodic transmission of such messages in order to maintain an aggregated link in a LAG (also referred to as a "NIC bond" in a Linux-based context).

By emulating a link aggregation partner at a network node for the VNICs at the compute nodes, standard link aggregation protocol stacks may be implemented at the compute nodes without modification, thereby permitting "off-the-shelf" software that relies on these standard link aggregation protocol stacks to execute at the compute nodes without modification or adjustment to accommodate the peripheral resource virtualization architecture of the cluster compute server.

For ease of illustration, link aggregation emulation techniques are described below in the example context of the Link Aggregation Control Protocol (LACP) as promulgated in the IEEE 802.1ax specification (which was formally the IEEE 802.3ae specification). However, such descriptions are exemplary only, and the techniques described herein may be employed for any of a variety of standardized or proprietary link aggregation protocols, such as the EtherChannel and Port Aggregation Protocol promulgated by Cisco Systems Inc. Accordingly, reference to "LACP" herein also includes reference to other link aggregation protocols unless otherwise noted. Moreover, these techniques are also described in the example context of a cluster compute server as described below with reference to FIGS. 1-6. Examples of such servers include the SM10000 series or the SM15000 series of servers available from the SeaMicro™ division of Advanced Micro Devices, Inc. Although a general description is described below, additional details regarding embodiments of the cluster compute server are found in U.S. Pat. Nos. 7,925,802 and 8,140,719, the entireties of which are incorporated by reference herein. The techniques described herein are not limited to this example context, but instead may be implemented in any of a variety of servers. Moreover, while these techniques are described in the context of an Ethernet implementation employing MAC addresses, these techniques may be implemented in any of a variety of link layer protocols and addressing schemes.

FIG. 1 illustrates a cluster compute server 100 in accordance with some embodiments. The cluster compute server 100, referred to herein as "server 100", comprises a data center platform that brings together, in a single rack unit (RU) system, computation, storage, switching, and server management. The server 100 is based on a parallel array of independent low power compute nodes (e.g., compute nodes 101-106), storage nodes (e.g., storage nodes 107-109), network nodes (e.g., network nodes 110 and 111), and management nodes (e.g., management node 113) linked together by a fabric interconnect 112, which comprises a high-bandwidth, low-latency supercomputer interconnect. Each node is implemented as a separate field replaceable unit (FRU) comprising components disposed at a printed circuit board (PCB)-based card or blade so as to facilitate efficient build-up, scaling, maintenance, repair, and hot swap capabilities.

The compute nodes operate to execute various software programs, including operating systems (OSs), hypervisors, virtualization software, compute applications, and the like. As with conventional server nodes, the compute nodes of the server 100 include one or more processors and system memory to store instructions and data for use by the one or more processors. However, unlike conventional server nodes, in some embodiments the compute nodes do not individually incorporate various local peripherals, such as storage, I/O control, and network interface controllers (NICs). Rather, remote peripheral resources of the server 100 are shared among the compute nodes, thereby allowing many of the components typically found on a server motherboard, such as I/O controllers and NICs, to be eliminated from the compute nodes and leaving primarily the one or more processors and the system memory, in addition to a fabric interface device.

The fabric interface device, which may be implemented as, for example, an application-specific integrated circuit (ASIC), operates to virtualize the remote shared peripheral resources of the server 100 such that these remote peripheral resources appear to the OS and other software executing at each processor to be located on corresponding processor's local peripheral bus. These virtualized peripheral resources can include, but are not limited to, mass storage devices, consoles, Ethernet NICs, Fiber Channel NICs, Infiniband™ NICs, storage host bus adapters (HBAs), basic input/output system (BIOS), Universal Serial Bus (USB) devices, Firewire™ devices, PCIe devices, and the like. This virtualization and sharing of remote peripheral resources in hardware renders the virtualization of the remote peripheral resources transparent to the OS and other local software at the compute nodes. Moreover, this virtualization and sharing of remote peripheral resources via the fabric interface device permits use of the fabric interface device in place of a number of components typically found on the server motherboard. This reduces the number of components implemented at each compute node, which in turn enables the compute nodes to have a smaller form factor while consuming less energy than conventional server blades which implement separate and individual peripheral resources.

The storage nodes and the network nodes (collectively referred to as "peripheral resource nodes") implement a peripheral device controller that manages one or more shared peripheral resources. This controller coordinates with the fabric interface devices of the compute nodes to virtualize and share the peripheral resources managed by the resource manager. To illustrate, the storage node 107 manages a hard disc drive (HDD) 116 and the storage node 108 manages a solid state drive (SSD) 118. In some embodiments, any internal mass storage device can mount any processor. Further, mass storage devices may be logically separated into slices, or "virtual disks", each of which may be allocated to a single compute node, or, if used in a read-only mode, shared by multiple compute nodes as a large shared data cache. The sharing of a virtual disk enables users to store or update common data, such as operating systems, application software, and cached data, once for the entire server 100. As another example of the shared peripheral resources managed by the peripheral resource nodes, the storage node 109 manages a remote BIOS 120, a console/universal asynchronous receiver-transmitter (UART) 121, and a data center management network 123. The network nodes 110 and 111 each manage one or more Ethernet uplinks connected to a data center network 114. The Ethernet uplinks are analogous to the uplink ports of a top-of rack switch and can be configured to connect directly to, for example, an end-of-row switch or core switch of the data center network 114. The remote BIOS 120 can be virtualized in the same manner as mass storage devices, NICs and other peripheral resources so as to operate as the local BIOS for some or all of the nodes of the server, thereby permitting such nodes to forgo implementation of a local BIOS at each node.

The fabric interface device of the compute nodes, the fabric interfaces of the peripheral resource nodes, and the fabric interconnect 112 together operate as a fabric 122 connecting the computing resources of the compute nodes with the peripheral resources of the peripheral resource nodes. To this end, the fabric 122 implements a distributed switching facility whereby each of the fabric interfaces and fabric interface devices comprises multiple ports connected to bidirectional links of the fabric interconnect 112 and operate as link layer switches to route packet traffic among the ports in accordance with deterministic routing logic implemented at the nodes of the server 100. Note that the term "link layer" generally refers to the data link layer, or layer 2, of the Open System Interconnection (OSI) model.

The fabric interconnect 112 can include a fixed or flexible interconnect such as a backplane, a printed wiring board, a motherboard, cabling or other flexible wiring, or a combination thereof. Moreover, the fabric interconnect 112 can include electrical signaling, photonic signaling, or a combination thereof. In some embodiments, the links of the fabric interconnect 112 comprise high-speed bi-directional serial links implemented in accordance with one or more of a Peripheral Component Interconnect—Express (PCIE) standard, a Rapid IO standard, a Rocket IO standard, a Hyper-Transport standard, a FiberChannel standard, an Ethernet-based standard, such as a Gigabit Ethernet (GbE) Attachment Unit Interface (XAUI) standard, and the like.

Although the FRUs implementing the nodes typically are physically arranged in one or more rows in a server box as described below with reference to FIG. 3, the fabric 122 can logically arrange the nodes in any of a variety of mesh topologies or other network topologies, such as a torus, a multi-dimensional torus (also referred to as a k-ary n-cube), a tree, a fat tree, and the like. For purposes of illustration, the server 100 is described herein in the context of a multi-dimensional torus network topology. However, the described techniques may be similarly applied in other network topologies using the guidelines provided herein.

Figure 2:
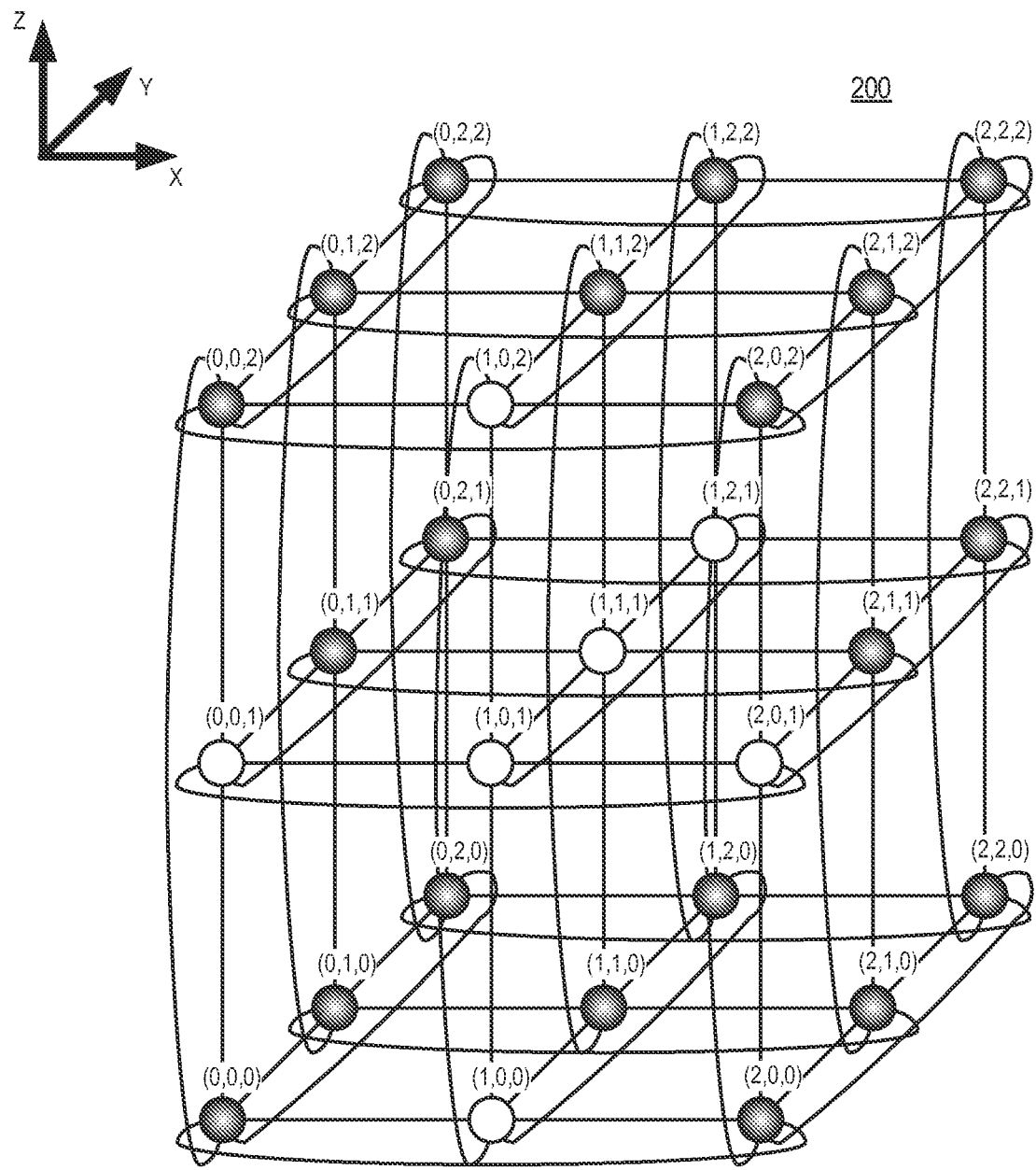
FIG. 2 is a block diagram illustrating an example network topology implemented for a cluster compute server in accordance with some embodiments.

FIG. 2 illustrates an example configuration of the server 100 in a network topology arranged as a k-ary n-cube, or multi-dimensional torus, in accordance with some embodiments. In the depicted example, the server 100 implements a three-dimensional (3D) torus network topology (referred to herein as "torus network 200") with a depth of three (that is, k=n=3). Accordingly, the server 100 implements a total of twenty-seven nodes arranged in a network of rings formed in three orthogonal dimensions (X,Y,Z), and each node is a member of three different rings, one in each of the dimensions. Each node is connected to up to six neighboring nodes via bidirectional serial links of the fabric interconnect 112 (see FIG. 1). The relative location of each node in the torus network 200 is identified in FIG. 2 by the position tuple (x,y,z), where x, y, and z represent the positions of the compute node in the X, Y, and Z dimensions, respectively. As such, the tuple (x,y,z) of a node also may serve as its address within the torus network 200, and thus serve as source routing control for routing packets to the destination node at the location represented by the position tuple (x,y,z). In some embodiments, one or more media access control (MAC) addresses can be temporarily or permanently associated with a given node. Some or all of such associated MAC address may directly represent the position tuple (x,y,z), which allows the location of a destination node in the torus network 200 to be determined and source routed based on the destination MAC address of the packet. Distributed look-up tables of MAC address to position tuple translations may be cached at the nodes to facilitate the identification of the position of a destination node based on the destination MAC address.

It will be appreciated that the illustrated X, Y, and Z dimensions represent logical dimensions that describe the positions of each node in a network, but do not necessarily represent physical dimensions that indicate the physical placement of each node. For example, the 3D torus network topology for torus network 200 can be implemented via the wiring of the fabric interconnect 112 with the nodes in the network physically arranged in one or more rows on a backplane or in a rack. That is, the relative position of a given node in the torus network 200 is defined by nodes to which it is connected, rather than the physical location of the compute node. In some embodiments, the fabric 122 (see FIG. 1) comprises a plurality of sockets wired together via the fabric interconnect 112 so as to implement the 3D torus network topology, and each of the nodes comprises a field replaceable unit (FRU) configured to couple to the sockets used by the fabric interconnect 112, such that the position of the node in torus network 200 is dictated by the socket into which the FRU is inserted.

In the server 100, messages communicated between nodes are segmented into one or more packets, which are routed over a routing path between the source node and the destination node. The routing path may include zero, one, or more than one intermediate node. As noted above, each node includes an interface to the fabric interconnect 112 that implements a link layer switch to route packets among the ports of the node connected to corresponding links of the fabric interconnect 112. In some embodiments, these distributed switches operate to route packets over the fabric 122 using source routing or a fixed routing scheme, such as a strict deterministic dimensional-order routing scheme (that is, completely traversing the torus network 200 in one dimension before moving to another dimension) that aids in avoiding fabric deadlocks. To illustrate an example of strict deterministic dimensional-order routing, a packet transmitted from the node at location (0,0,0) to location (2,2,2) would, if initially transmitted in the X dimension from node (0,0,0) to node (1,0,0) would continue in the X dimension to node (2,0,0), whereupon it would move in the Y plane from node (2,0,0) to node (2,1,0) and then to node (2,2,0), and then move in the Z plane from node (2,2,0) to node (2,2,1), and then to node (2,2,2). The order in which the planes are completely traversed between source and destination may be preconfigured and may differ for each node.

Moreover, as there are multiple routes between nodes in the torus network 200, the fabric 212 can be programmed for packet traffic to traverse a secondary path in case of a primary path failure. The fabric 212 also can implement packet classes and virtual channels to more effectively utilize the link bandwidth and eliminate packet loops, and thus avoid the need for link-level loop prevention and redundancy protocols such as the spanning tree protocol.

In some embodiments, certain types of nodes may be limited by design in their routing capabilities. For example, compute nodes may be permitted to act as intermediate nodes that exist in the routing path of a packet between the source node of the packet and the destination node of the packet, whereas peripheral resource nodes may be configured so as to act as only source nodes or destination nodes, and not as intermediate nodes that route packets to other nodes. In such scenarios, the routing paths in the fabric 122 can be configured to ensure that packets are not routed through peripheral resource nodes.

Various packet routing and techniques protocols may be implemented by the fabric 122. For example, to avoid the need for large buffers at switch of each node, the fabric 122 may use flow control digit ("flit")-based switching whereby each packet is segmented into a sequence of flits. The first flit, called the header flit, holds information about the packet's route (namely the destination address) and sets up the routing behavior for all subsequent flit associated with the packet. The header flit is followed by zero or more body flits, containing the actual payload of data. The final flit, called the tail flit, performs some bookkeeping to release allocated resources on the source and destination nodes, as well as on all intermediate nodes in the routing path. These flits then may be routed through the torus network 200 using cut-through routing, which allocates buffers and channel bandwidth on a packet level, or wormhole routing, which allocated buffers and channel bandwidth on a flit level. Wormhole routing has the advantage of enabling the use of virtual channels in the torus network 200. A virtual channel holds the state needed to coordinate the handling of the flits of a packet over a channel, which includes the output channel of the current node for the next hop of the route and the state of the virtual channel (e.g., idle, waiting for resources, or active). The virtual channel may also include pointers to the flits of the packet that are buffered on the current node and the number of flit buffers available on the next node.

Figure 3:
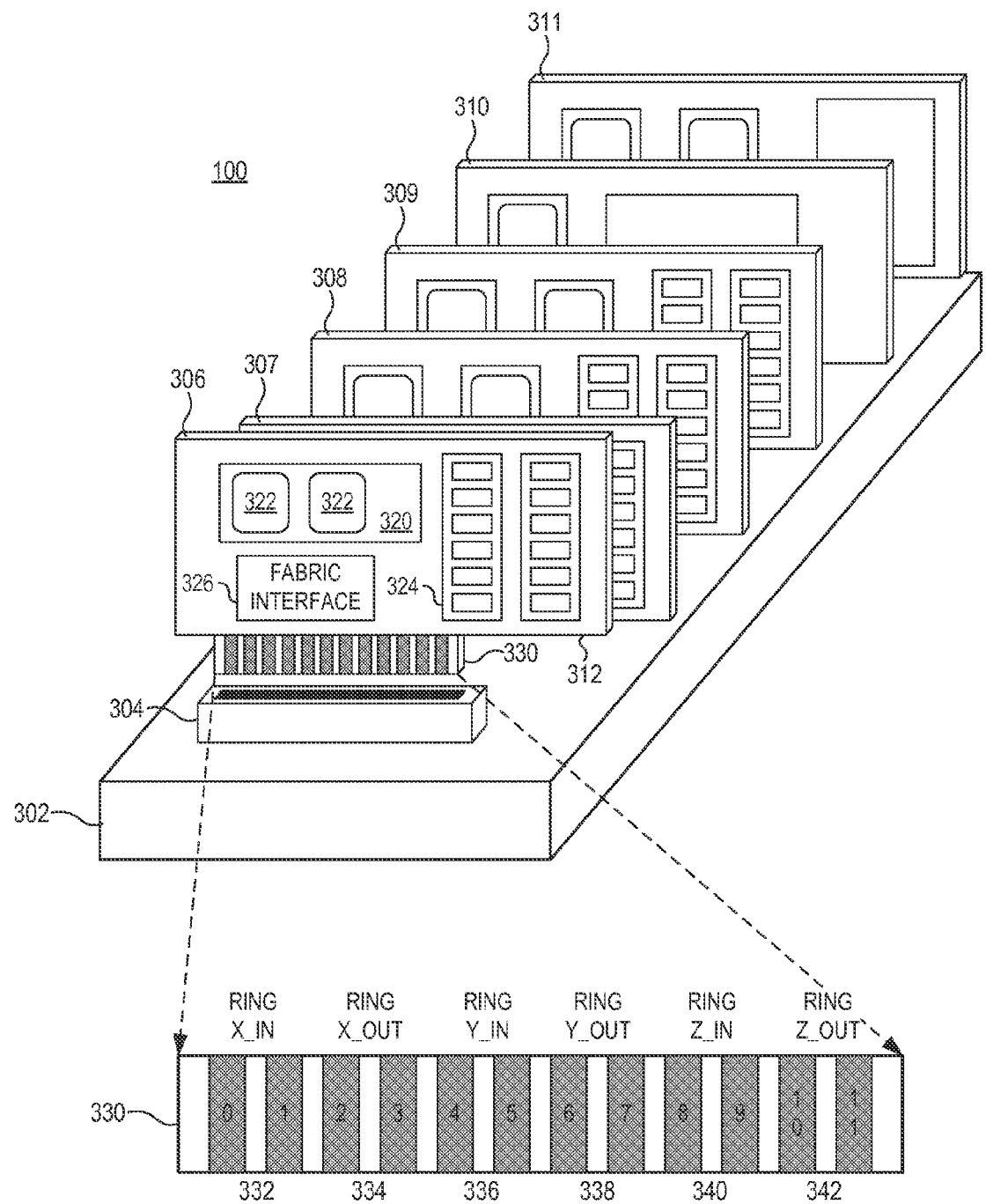
FIG. 3 is a block diagram illustrating an example physical arrangement of nodes of a cluster compute server in accordance with some embodiments.

FIG. 3 illustrates an example physical arrangement of nodes of the server 100 in accordance with some embodiments. In the illustrated example, the fabric interconnect 112 (FIG. 1) includes one or more interconnects 302 having one or more rows or other aggregations of plug-in sockets 304. The interconnect 302 can include a fixed or flexible interconnect, such as a backplane, a printed wiring board, a motherboard, cabling or other flexible wiring, or a combination thereof. Moreover, the interconnect 302 can implement electrical signaling, photonic signaling, or a combination thereof. Each plug-in socket 304 comprises a card-edge socket that operates to connect one or more FRUs, such as FRUs 306-311, with the interconnect 302. Each FRU represents a corresponding node of the server 100. For example, FRUs 306-309 may comprise compute nodes, FRU 310 may comprise a network node, and FRU 311 can comprise a storage node.

Each FRU includes components disposed on a PCB, whereby the components are interconnected via metal layers of the PCB and provide the functionality of the node represented by the FRU. For example, the FRU 306, being a compute node in this example, includes a PCB 312 implementing a processor 320 comprising one or more processor cores 322, one or more memory modules 324, such as DRAM dual inline memory modules (DIMMs), and a fabric interface device 326. Each FRU further includes a socket interface 330 that operates to connect the FRU to the interconnect 302 via the plug-in socket 304.

The interconnect 302 provides data communication paths between the plug-in sockets 304, such that the interconnect 302 operates to connect FRUs into rings and to connect the rings into a 2D- or 3D-torus network topology, such as the torus network 200 of FIG. 2. The FRUs take advantage of these data communication paths through their corresponding fabric interfaces, such as the fabric interface device 326 of the FRU 306. The socket interface 330 provides electrical contacts (e.g., card edge pins) that electrically connect to corresponding electrical contacts of plug-in socket 304 to act as port interfaces for an X-dimension ring (e.g., ring-X_IN port 332 for pins 0 and 1 and ring-X_OUT port 334 for pins 2 and 3), for a Y-dimension ring (e.g., ring-Y_IN port 336 for pins 4 and 5 and ring-Y_OUT port 338 for pins 6 and 7), and for an Z-dimension ring (e.g., ring-Z_IN port 340 for pins 8 and 9 and ring-Z_OUT port 342 for pins 10 and 11). In the illustrated example, each port is a differential transmitter comprising either an input port or an output port of, for example, a PCIE lane. A skilled artisan will understand that a port can include additional TX/RX signal pins to accommodate additional lanes or additional ports.

Figure 4:
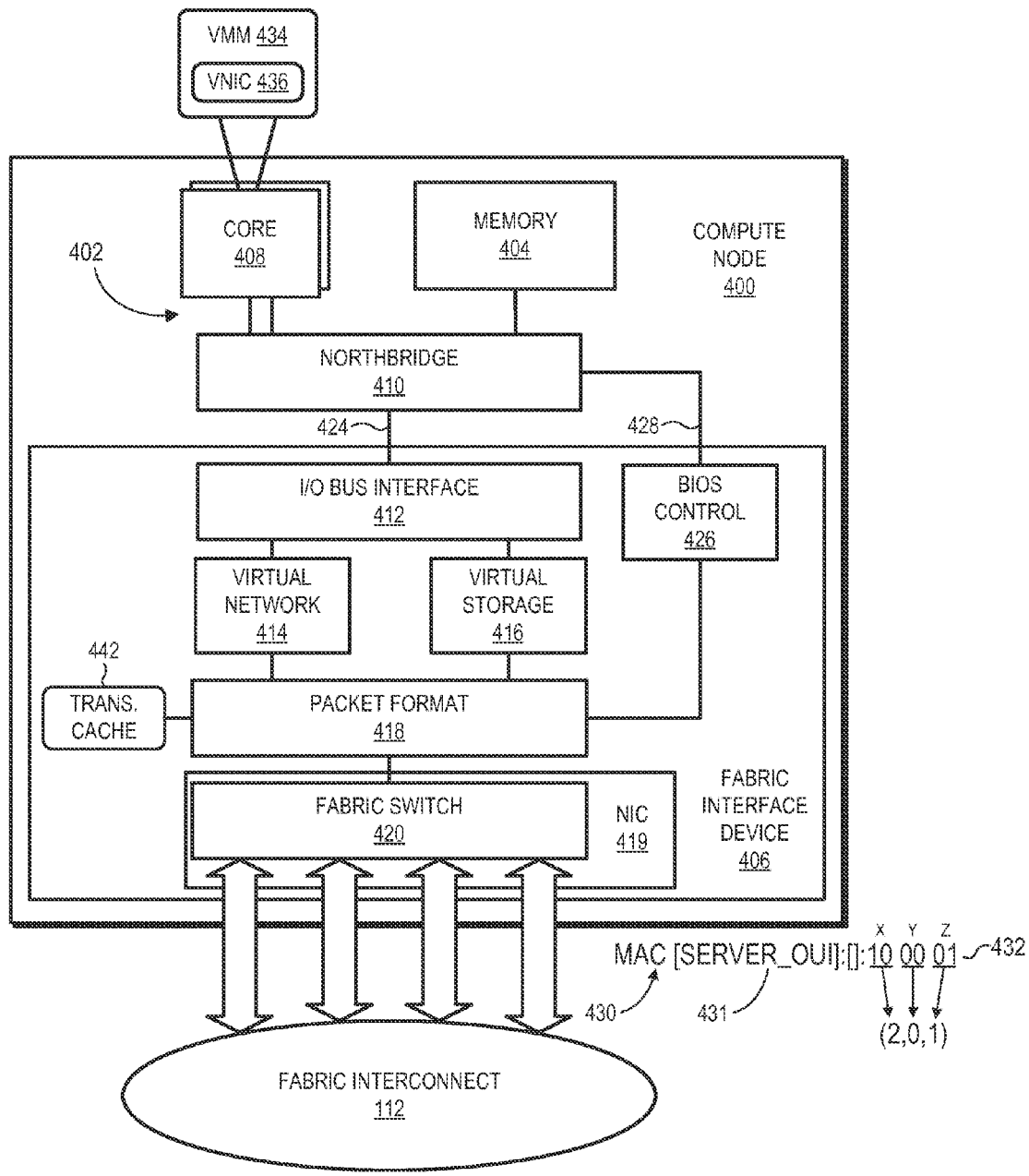
FIG. 4 is a block diagram illustrating an example implementation of a compute node of a cluster compute server in accordance with some embodiments.

FIG. 4 illustrates a compute node 400 implemented in the server 100 of FIG. 1 in accordance with some embodiments. The compute node 400 corresponds to, for example, one of the compute nodes 101-106 of FIG. 1. In the depicted example, the compute node 400 includes a processor 402, system memory 404, and a fabric interface device 406 (representing the processor 320, system memory 324, and the fabric interface device 326, respectively, of FIG. 3). The processor 402 includes one or more processor cores 408 and a northbridge 410. The one or more processor cores 408 can include any of a variety of types of processor cores, or combination thereof, such as a central processing unit (CPU) core, a graphics processing unit (GPU) core, a digital signal processing unit (DSP) core, and the like, and may implement any of a variety of instruction set architectures, such as an x86 instruction set architecture or an Advanced RISC Machine (ARM) architecture. The system memory 404 can include one or more memory modules, such as DRAM modules, SRAM modules, flash memory, or a combination thereof. The northbridge 410 interconnects the one or more cores 408, the system memory 404, and the fabric interface device 406. The fabric interface device 406, in some embodiments, is implemented in an integrated circuit device, such as an application-specific integrated circuit (ASIC), a field-programmable gate array (FPGA), mask-programmable gate arrays, programmable logic, and the like.

In a conventional computing system, the northbridge 410 would be connected to a southbridge, which would then operate as the interface between the northbridge 410 (and thus the processor cores 208) and one or local more I/O controllers that manage local peripheral resources. However, as noted above, in some embodiments the compute node 400 does not maintain local peripheral resources or their I/O controllers, and instead uses shared remote peripheral resources at other nodes in the server 100. To render this arrangement transparent to software executing at the processor 402, the fabric interface device 406 virtualizes the remote peripheral resources allocated to the compute node such that the hardware of the fabric interface device 406 emulates a southbridge and thus appears to the northbridge 410 as a local southbridge connected to local peripheral resources.

To this end, the fabric interface device 406 includes an I/O bus interface 412, a virtual network controller 414, a virtual storage controller 416, a packet formatter 418, and a NIC 419 comprising a fabric switch 420. The I/O bus interface 412 connects to the northbridge 410 via a local I/O bus 424 and acts as a virtual endpoint for each local processor core 408 by intercepting requests addressed to virtualized peripheral resources that appear to be on the local I/O bus 424 and responding to the requests in the same manner as a local peripheral resource, although with a potentially longer delay due to the remote location of the peripheral resource being virtually represented by the I/O bus interface 412.

While the I/O bus interface 412 provides the physical interface to the northbridge 410, the higher-level responses are generated by the virtual network controller 414 and by the virtual storage controller 416. Requests sent over I/O bus 424 for a network peripheral connected to an external network, such as an Ethernet NIC connected to the data center network 114 (FIG. 1), are routed by the I/O bus interface 412 to the virtual network controller 414, while all other requests are routed by the I/O bus interface 412 to the virtual storage controller 416. The virtual network controller 414 provides processing of incoming and outgoing requests based on, for example, an Ethernet protocol. The virtual storage controller provides processing of incoming and outgoing requests based on, for example, a serial ATA (SATA) protocol, a serial attached SCSI (SAS) protocol, a Universal Serial Bus (USB) protocol, and the like.

After being processed by either the virtual network controller 414 or the virtual storage controller 416, requests are forwarded to the packet formatter 418, which encapsulates the request into one or more packets. The packet formatter 418 then determines the address or other location identifier of the peripheral resource node managing the physical peripheral resource intended for the request using deterministic routing logic implemented by the fabric switch 420. The deterministic routing logic may store entries with data or other information representing the routing rules for the fabric 122 so as to enforce a fixed routing path or source routing control. The packet formatter 418 adds the address to the headers of the one or more packets in which the request is encapsulated and provides the packets to the fabric switch 420 of the NIC 419 for transmission.

As illustrated, the fabric switch 420 implements a plurality of ports, each port interfacing with a different link of the fabric interconnect 112. To illustrate using the 3×3 torus network 200 of FIG. 2, assume the compute node 400 represents the node at (1,1,1). In this example, the fabric switch 420 would have at least seven ports to couple it to seven bi-directional links: an internal link to the packet formatter 418; an external link to the node at (0,1,1); an external link to the node at (1,0,1), an external link to the node at (1,1,0), an external link to the node at (1,2,1), an external link to the node at (2,1,1), and an external link to the node at (1,1,2). Control of the switching of data among the ports of the fabric switch 420 is determined based on the deterministic routing logic, which specifies the egress port based on the destination address indicated by the packet.

For responses to outgoing requests and other incoming requests (e.g., requests from other compute nodes or from peripheral resource nodes), the process described above is reversed. The fabric switch 420 receives an incoming packet and routes the incoming packet to the port connected to the packet formatter 418 based on the deterministic routing logic. The packet formatter 418 then deencapsulates the response/request from the packet and provides it to either the virtual network controller 414 or the virtual storage controller 416 based on a type-identifier included in the request. The controller receiving the request then processes the response/request and controls the I/O bus interface 412 to signal the request to the northbridge 410, whereupon the response/request is processed as though it were a response or request from a local peripheral resource.

For a transitory packet for which the compute node 400 is an intermediate node in the routing path for the packet, the fabric switch 420 determines the destination address (e.g., the tuple (x,y,z)) from the header of the transitory packet, and provides the packet to a corresponding output port identified from the routing information represented in the deterministic routing logic.

The NIC 419 of each compute node 400 is assigned a unique MAC address 430 that includes an organizationally unique identifier (OUI) field 431 and a NIC-specific field 432. The value stored in the OUI field 431 is common to the MAC address of each NIC 419, and thus this value identifies the MAC address as a node of the server 100. The NIC-specific field 432 is used to store a value indicative of the location of the compute node 400 in the network topology of the server 100. To illustrate using the 3D torus network 200 of FIG. 2, the NIC-specific field 432 includes a value that represents the position tuple (x,y,z) identifying the location of the compute node 400 at position x in the X dimension, position y in the Y dimension, and position z in the Z dimension in a 3D torus network topology. In the 3×3×3 example of FIG. 2, this value can comprise a six bit value, with the first two-bit subset representing x, the second two-bit subset representing y, and the third two-bit subset representing z. For example, assume that the compute node 400 is located in the torus network 200 at location (2,0,1). In this example, the control plane of a management node of the server 100 would assign to the NIC 419 a MAC address with a bit value of 10 00 01b for its last six bits so as to represent its location as tuple (2,0,1). In a 4×4×4 example of a 3D torus, the MAC address assigned the NIC 419 could use the last twelve bits to represent the position tuple (x,y,z) of the compute node 400.

As noted above, the fabric 122 (FIG. 1) of the server 100 can comprise a fixed routing fabric whereby the routing path between a source node and a destination node is deterministic, and thus the location indicated by the NIC-specified field 432 in the MAC address 430 also directly specifies or controls the particular routing path to be used for routing the packet to the node having the MAC address 430. Thus, for packets having location-specific MAC addresses as the destination MAC address, the fabric switch 420 can use the location identifier references in the NIC-specified field 432 in the MAC address to identify the appropriate egress port and forward the packet to the identified egress port accordingly.

As noted above, the BIOS likewise can be a virtualized peripheral resource. In such instances, the fabric interface device 406 can include a BIOS controller 426 connected to the northbridge 410 either through the local I/O bus 424 or via a separate low pin count (LPC) bus 428. As with storage and network resources, the BIOS controller 426 can emulate a local BIOS by responding to BIOS requests from the northbridge 410 by forwarding the BIOS requests via the packet formatter 418 and the fabric switch 420 to a peripheral resource node managing a remote BIOS, and then providing the BIOS data supplied in turn to the northbridge 410.

Figure 5:
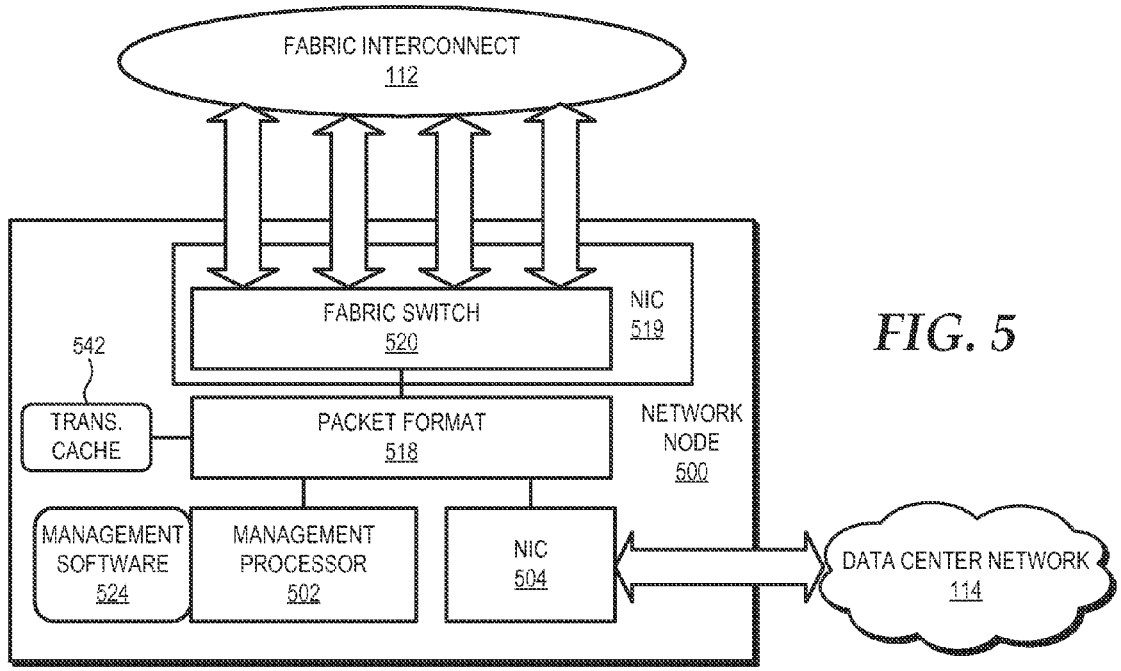
FIG. 5 is a block diagram illustrating an example implementation of a network node of a cluster compute server in accordance with some embodiments.

FIG. 5 illustrates a network node 500 implemented in the server 100 of FIG. 1 in accordance with some embodiments. The network node 500 corresponds to, for example, network nodes 110 and 111 of FIG. 1. In the depicted example, the network node 500 includes a management processor 502, an uplink NIC 504 connected to, for example, an external Ethernet network such as the data center network 114, a network processing unit (NPU) 518, and a fabric-side NIC 519, which includes a fabric switch 520. As with the fabric switch 420 of FIG. 4, the fabric switch 520 operates to switch incoming and outgoing packets among its plurality of ports based on local deterministic routing logic. The fabric switch 520 may employ a local translation cache 542 to enable location-independent MAC address to location-specific MAC address translation.

A packetized incoming request intended for the uplink NIC 504 (which is virtualized to appear to the processor 402 of a compute node 400 as a local NIC) is intercepted by the fabric switch 520 from the fabric interconnect 112 and routed to the NPU 518, which deencapsulates the packet and forwards the request to the uplink NIC 504. The uplink NIC 504 then performs the one or more operations dictated by the request. Conversely, outgoing messages from the uplink NIC 504 are encapsulated by the NPU 518 into one or more packets, and the NPU 518 determines the destination address using the deterministic routing logic and inserts the destination address into the header of the outgoing packets. The outgoing packets are then switched to the port associated with the link in the fabric interconnect 112 connected to the next node in the fixed routing path between the network node 500 and the intended destination node.

The management processor 502 executes management software 524 stored in a local storage device (e.g., firmware ROM or flash memory) to provide various management functions for the server 100. These management functions can include maintaining a centralized master link layer address translation table and distributing portions thereof to the local translation caches of individual nodes. Further, in some embodiments, the management functions provided by the management processor 502 can include link aggregation-related techniques, such as the link aggregation partner emulation techniques described in greater detail below with reference to FIGS. 7-13.

Figure 6:
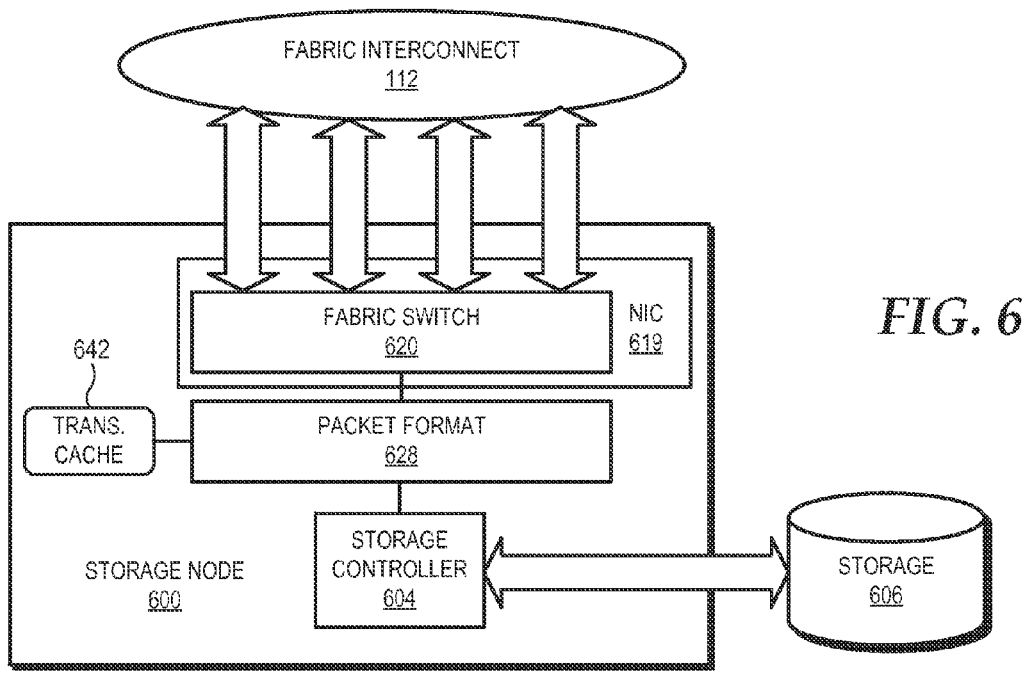
FIG. 6 is a block diagram illustrating an example implementation of a storage node of a cluster compute server in accordance with some embodiments.

FIG. 6 illustrates a storage node 600 implemented in the server 100 of FIG. 1 in accordance with some embodiments. The storage node 600 corresponds to, for example, storage nodes 107-109 of FIG. 1. As illustrated, the storage node 600 is configured similar to the network node 500 of FIG. 5 and includes a NIC 619 having a fabric switch 620, a packet formatter 618, and a local translation cache 642, which operate in the manner described above with reference to the fabric switch 520, the NPU 518, and the local translation cache 642 of the network node 500 of FIG. 5. However, rather than implementing a NIC, the storage node 600 implements a storage device controller 604, such as a SATA controller. A depacketized incoming request is provided to the storage device controller 604, which then performs the operations represented by the request with respect to a mass storage device 606 or other peripheral device (e.g., a USB-based device). Data and other responses from the peripheral device are processed by the storage device controller 604, which then provides a processed response to the packet formatter 618 for packetization and transmission by the fabric switch 620 to the destination node via the fabric interconnect 112.

Figure 7:
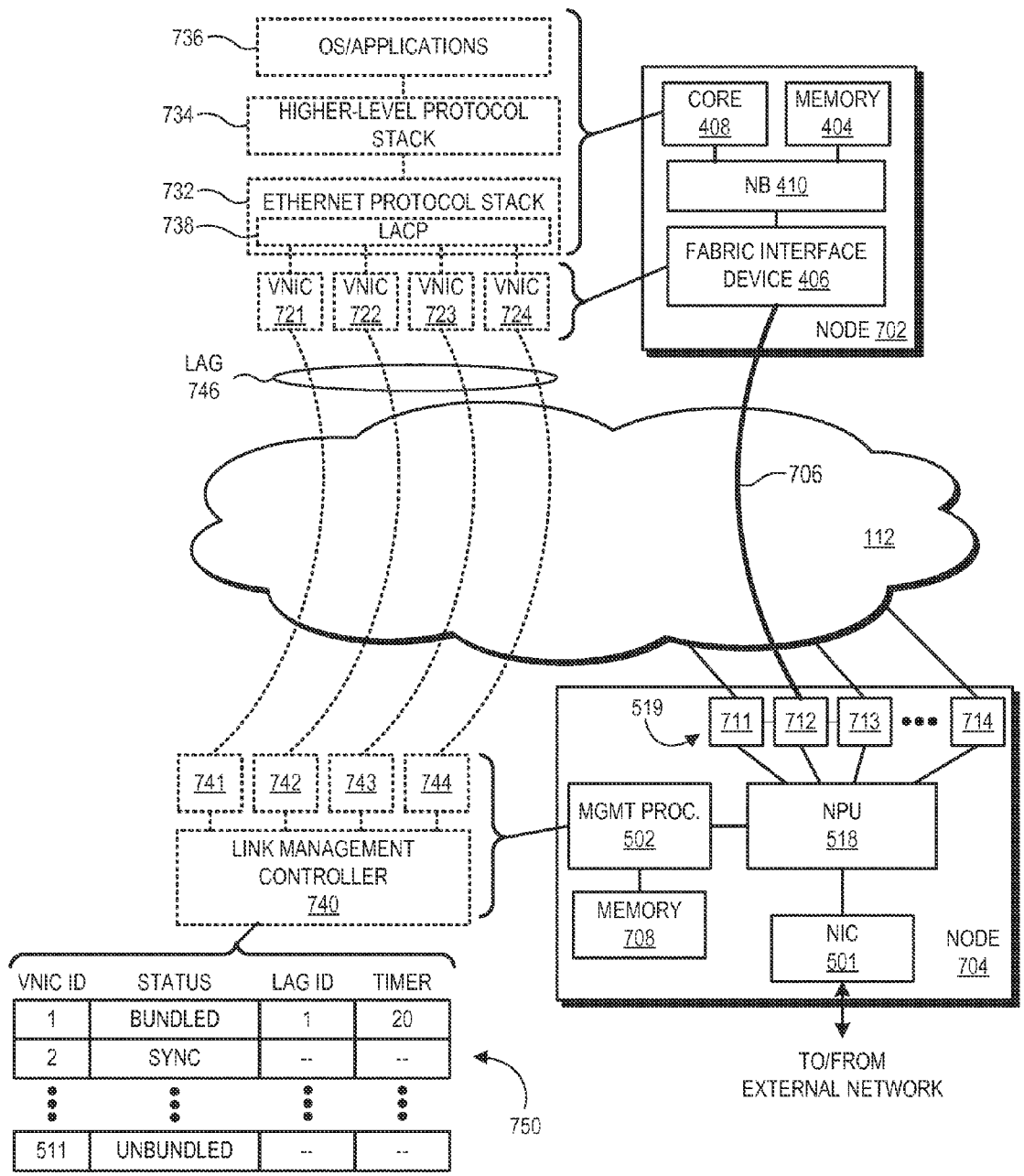
FIG. 7 is a diagram illustrating an example technique for supporting link aggregation for virtual network interface controllers in a cluster compute server in accordance with some embodiments.

FIG. 7 illustrates an example technique for link aggregation partner emulation to enable aggregation, or "bonding", of VNICs at a compute node in accordance with some embodiments. In the depicted example, a compute node 702 of the server 100 (FIG. 1) is connected to remote network node 704 via a routing path 706 through the routing fabric 112. The compute node 702 comprises the one or more processor cores 408, the system memory 404, the northbridge 410, and the fabric interface device 406 as described above with reference to FIG. 4. The network node 704 comprises the NPU 518, the external-network-facing NIC 501, the management processor 502, and the fabric-facing NIC 519 as described above with reference to FIG. 5. The network node 704 further includes a system memory 708 to store management software 524 (FIG. 5). The NIC 519 includes a plurality of ports, such as ports 711-714, coupled to corresponding links of the fabric interconnect 112.

In the depicted scenario, the fabric interface device 406 operates to provide a plurality of VNICs, such as four illustrated VNICs 721, 722, 723, and 724, that appear to the other software and hardware components of the compute node 702 as four local, physical NICs using the peripheral resource virtualization techniques described above. Each of the VNICs 721-724 is a virtualized representation of the NIC 501 such that the fabric interface device 406, the fabric interconnect 112, and the network node 704 operate to route packets between the VNICs 721-724 and the NIC 501 via the route path 706 in a manner that makes it appear to the northbridge 410 and the processor core 408 that the NIC 501 is a local NIC resource for the node 702.

The VNICs 721-724 are managed by an Ethernet protocol stack 732 that serves as the interface between the VNICS 721-724 and higher-level protocol stacks 734 (e.g., a Transmission Control Protocol/Internet Protocol (TCP/IP) protocol stack) and operating system/application software 736 executed by the processor core 408 and stored in the memory 404. In some embodiments, the Ethernet protocol stack 732 implements an LACP protocol stack 738 or other link aggregation protocol stack to provide link aggregation services to transmit and receive data flows on behalf of the OS and applications executed at the compute node 702. As the VNICs 721-724 appear as local physical VNICs to the software executed at the compute node 702, the LACP protocol stack 738 operates to attempt to establish one or more link aggregations using the VNICs 721-724. However, as the depicted scenario illustrates, the VNICs 721-724 do not each represent a separate physical point-to-point link, and thus could otherwise prevent the LACP protocol stack 738 from discovering LACP-enabled link aggregation partners.

In certain implementations, the protocol stacks or other software executed at the compute node 702 relies on the establishment of a link aggregated group (LAG) (also called a "NIC bond" in Linux-based context) and thus is potentially at risk of stalled or diminished operation in the event that a LAG cannot be established. For example, an operating system may be configured to permit receipt or forwarding of packets only once a LAG is bundled. Thus, if a LAG is unable to be formed using the VNICs 721-724, no traffic will flow through the VNICs in such circumstances. Accordingly, to provide a seamless integration whereby the LACP protocol stack 738 is enabled to operate to establish one or more LAGs among the VNICs 721-724 using the standard or typical process (that is, in the same manner as though the VNICs 721-724 were actual local physical NICs), the network node 704 provides a link aggregation controller 740 that emulates the remote ends of the "links" connected to the VNICs 721-724 for link aggregation purposes. This emulation includes support for the discovery, aggregation, and LAG maintenance processes typically found in link aggregation protocols.

In the discovery process, a discovery link aggregation message (e.g., a LACP protocol data unit (PDU)) is sent out over each link of interest to identify whether there is a device at the other end of the link, and if so, whether the device is LACP-enabled and has the same physical layer characteristics as the transmitting port (that is, the two ports are compatible). Accordingly, to facilitate this process, the link aggregation controller 740 emulates a link aggregation partner (e.g., a LACP-enabled remote port) for each of the VNICs 721-724 of the compute node 702. VNIC-originated link aggregation messages from the VNICs 721-724 transmitted to the fabric interface device 406 to the network node 704, which in turn provides the VNIC-originated link aggregation messages to the link aggregation controller 740 for processing. The link aggregation controller 740 replies to a discovery link aggregation message with its own reply link aggregation message (e.g., another LACP PDU) that reports physical characteristics compatible with the physical layer characteristics indicated in the discovery link aggregation message. In response to the reply link aggregation message, the LACP protocol stack 738 concludes that that link is appropriately LACP-enabled and thus includes the VNIC in the link bonding process. This process is repeated for each VNIC so that the result is that the link aggregation controller 740 provides LACP-enabled and compatible emulated ports 741, 742, 743, and 744 for the VNICs 721, 722, 732, and 724, respectively. These emulated LACP-enabled ports act as link aggregation partners for the VNICs 721-724, and thus are also referred to herein as emulated link aggregation partners 741-744. This link partner emulation allows the LACP protocol stack 738 to identify each of VNICs 721-724 as available for aggregation into one of a set of one or more LAGs being configured by the LACP protocol stack 738.

Once the aggregateable links have been identified, an aggregation process begins whereby the aggregateable links are then grouped into one or more LAGs. In the LACP protocol, each peer identifies the links that it understands should be in a LAG per LACP specifications based on a system identifier and a key assigned to each link based on its physical characteristics and other characteristics. Each peer then communicates to the other a negotiation link aggregation message (e.g., another LACP PDU) that contains data representative of this understanding. In the event that both peers came to the same conclusion as to the link membership for the LAG, each peer then signals its readiness to transfer packets by sending a "ready" link aggregation message (e.g., another LACP PDU) to the other peer. Once both peers have signaled their readiness, each peer may begin transfer of data packets over the links of the LAG. To facilitate the seamless implementation of this process, the link aggregation controller 740 is configured to identify the link membership of a LAG 746 in accordance with the LACP protocol and the link information received in the discovery LACP PDUs sent by the VNICs 721-724. In other embodiments, the link aggregation controller 740 can simply respond to a negotiation link aggregation message from a VNIC with a reply link aggregation message proposing the same group membership proposed in the received negotiation link aggregation message from the VNIC. The link aggregation controller 740 then also sends a "ready" link aggregation message to each VNIC so as to enable the LACP protocol stack 738 to begin interfacing with the VNICs 721-724 as one or more LAGs 746.

Once the LAG is initialized, aggregators implemented at each end of the LAG operate to distribute packets among the links of the LAG based on one or distribution policies, such as a source address-destination address hash operation, a round-robin distribution, a load-balancing distribution, and the like. In the architecture of the server 100, this distribution applies at the logical level but not the physical level as the route path 706 between the compute node 702 and the network node 704 constitutes a single physical link that connects the node 702 to the fabric interconnect 112. Accordingly, packets transmitted from the VNICs 721-724 (that is, from the fabric interface device 406 that provides the instantiated VNICs) to the network node 704 are received by the NPU 518, which then forwards them to the NIC 501 for transmission to an external network. Conversely, for incoming packets destined for the compute node 702, the link aggregation controller 740 continues with the LACP emulation by distributing packets among the logical links to the VNICS 721-724 on the basis of the same load-balancing distribution policy employed by the LACP protocol stack 738 or using a different distribution policy. The fabric interface device 406 receives the packets and then routes them via the corresponding VNICs to the LACP protocol stack 738, which then passes them up the protocol stack.

While a LAG is operational, LACP provides for a maintenance process whereby each peer on a bonded link periodically transmits a "keep-alive" link aggregation message (e.g., a LACP PDU) to the other peer over the link so as to notify the peer that it desires to keep the corresponding link in the LAG. If a specified time has lapsed without a peer receiving a keep-alive link aggregation message, the peer concludes that the other peer is unable to keep the link in the LAG, and therefore removes the link from the LAG. As such, the LACP protocol stack 738 is expecting these keep-alive link aggregation messages from the link aggregation partners 741-744. Thus, in furtherance of the LACP partner emulation, the link aggregation controller 740 is configured to periodically transmit keep-alive link aggregation messages to the VNICs involved in an active LAG 746, thus giving the appearance that the corresponding emulated link aggregation partner is sending these keep-alive link aggregation messages. In the event that the LACP protocol stack 738 determines to cease the use of a link in the LAG 746, the LACP protocol stack 738 ceases transmission of keep-alive link aggregation message over the link. Accordingly, the link aggregation controller 740 is configured to note this cessation and, in response, cease transmission of its own keep-alive link aggregation messages over the link, thereby allowing the link to be removed, or deaggregated, from the LAG 746.

The link aggregation controller 740 implements a link state table 750 to facilitate this LACP partner emulation. Although described herein as a table structure, the link state table 750 can include any of a variety of data structures used to information. The link state table 750 includes N entries to support the formation of up to N VNIC's within the set of one or more compute nodes of the server 100 that is supported by the network node 704. For the following examples, it is assumed that up to 512 VNICs can be supported by the network node 704, and the link state table 750 thus includes 512 entries (that is, N=512) for these examples. Each entry includes a VNIC ID field, a status field, a LAG ID field, and a timer field. The VNIC ID field stores an identifier of the VNIC associated with the entry, such as a MAC address associated with the VNIC. The status field stores a link aggregation status for the corresponding VNIC, such as "unbundled" to represent that the corresponding VNIC is not bundled or not aggregated in a LAG, "bundled" to represent that the corresponding VNIC has been bundled or aggregated into a LAG, and "sync" to represent that the link aggregation controller 740 and the LACP protocol stack at the compute node implementing the corresponding VNIC are in the process of determining or negotiating the aggregation of the corresponding VNIC into a LAG. If the corresponding VNIC is bundled into a LAG, the LAG ID field stores an identifier of the LAG to which it currently belongs. For ease of illustration, the LAG IDs are depicted herein as a simple one-digit number, but in implementation LACP LAG identifiers typically are constructed from a the system identifier, operational key, and port identifiers involved in the LAG. The timer field includes timing information for the maintenance of the corresponding link, such as a value representing the time elapsed since the last keep-alive LACP PDU was transmitted from the corresponding VNIC and a value representing the time elapsed since the link aggregation controller last sent a keep-alive LACP PDU to the corresponding VNIC. As described below, the timer values stored in the timer field can be used as software-based or hard-coded timers used to periodically transmit keep-alive link aggregation message or to verify that VNIC-originated keep-alive link aggregations messages have been received on an expected schedule.

As described in greater detail below, the link aggregation controller 740 maintains and updates the link state table 750 responsive to LACP-related messaging received from the compute nodes in the server 100 and LACP-related messaging transmitted to the compute nodes from the link aggregation controller 740. The link aggregation controller 740 thus may use the information in the link state table 750 to accurately emulate LACP-based link aggregation partners for the LACP-enabled VNICs of the compute nodes in the server 100, thereby allowing the software at the compute nodes to implement a standard LACP protocol stack in a manner that appears to the LACP protocol stack as enabling the aggregation of physical NICs at the compute node, but in actuality is a logical aggregation of VNICs emulated by the fabric interface device 406 of the compute node in representation of a remote physical NIC at a network node.

In some embodiments, the link aggregation controller 740 is implemented as a collection of one or more state machines that implement the emulation of the LAG discovery, aggregation, and maintenance processes described herein. These state machines may be implemented in one or a combination of: hard-coded logic (e.g., in an application specific integrated circuit (ASIC)); programmable logic (e.g., in a field-programmable gate array (FPGA)); or the management processor 502 and the management software 524 (FIG. 5) that, when executed by the management processor 502, manipulates the management processor 502 to perform the functions and operations of the link aggregation controller 740 (e.g., as a LACP daemon executing on the management processor 502). These state machines may incorporate, in whole or in part, one or more of the state machines reflected in the LACP standard. FIGS. 9-12 below describe the various processed performed by these one or more state machines in flow diagram form.

Figure 8:
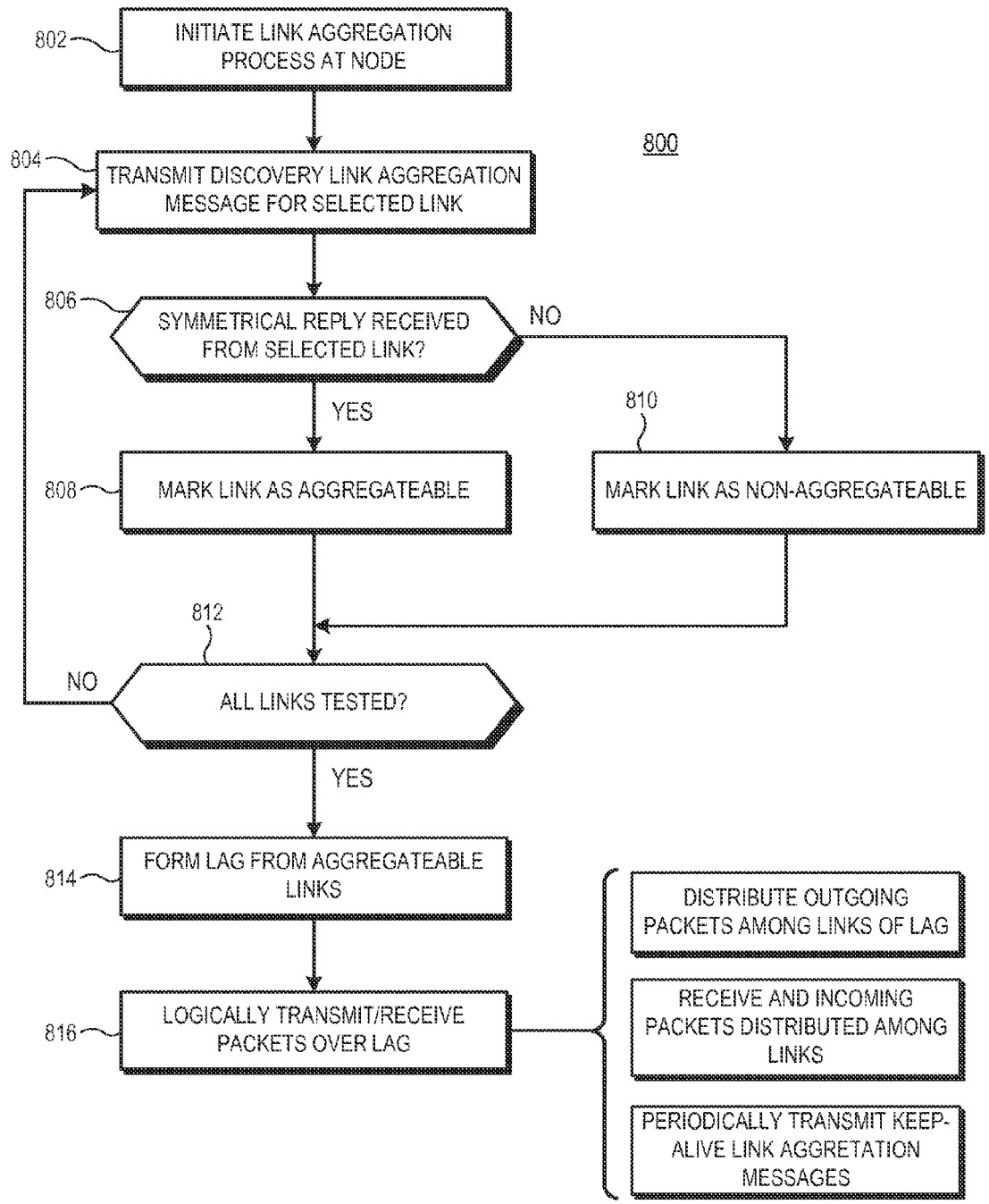
FIG. 8 is a flow diagram illustrating an example for establishing a link aggregation group for virtualized links of a cluster compute server in accordance with some embodiments.

FIG. 8 illustrates a method 800 for establishing a LAG using one or more VNICs implemented at a compute node of the server 100 in accordance with some embodiments. For purposes of illustration, the method 800 is described in the example context of the compute node 702 and the network node 704 of FIG. 7. As described above, the fabric interface device 406 operates in conjunction with the network node 704 to emulate a plurality of VNICs, such as VNICs 721-724, at the compute node 702 such that the VNICs appear to the other components of the compute node 702 as local physical NICs, but in fact are logical abstractions of the NIC 501 of the network node 704. However, as this virtualization is transparent to the software of the network node 704, the VNICs 721-724 appear as link-aggregation-enabled NICs. Accordingly, at block 802 the LACP protocol stack 738 initiates a link aggregation process to aggregate one or more of the VNICs 721-724 into a LAG for purposes of communicating packets to and from the compute node 702. Accordingly, at block 804 the LACP protocol stack 738 selects a VNIC and transmits a discovery link aggregation message to determine whether there is a link-aggregation-enabled partner at the other end of the link connected to the selected VNIC. The discovery link aggregation message includes, for example, a system identifier (typically encoded as a MAC address), an actor key value assigned by the LACP protocol stack 738, and actor state information, such as information indicating certain physical layer characteristics of the VNIC. The source address of the discovery LACP PDU is set to the MAC address assigned to the selected VNIC, and the destination address is set to a multicast address specified for LACP PDUs. The fabric interface device 406 receives this discovery link aggregation message and, in response to the multicast address as destination address, unicast transmits it over the routing path 706 in the fabric interconnect 112 to the network node 704. The network node 704, in turn, forwards the discovery link aggregation message to other network nodes in the server 100, thereby effectively "multicasting" the link aggregation message to the network nodes of the system 100. As described in greater detail below with reference to FIG. 9, the link aggregation controller 740 generates a "symmetrical" reply link aggregation message that mirrors the LACP-related information and transmits the symmetrical link aggregation message back to the LACP protocol stack 738 via the routing path 706 and the fabric interface device 406. This LACP PDU is "symmetrical" in that is represents symmetric or compatible physical layer characteristics, key values, and system IDs so as to allow the LACP protocol stack 738 to conclude that the emulated link aggregation partner at the other end of the link is LACP-enabled and compatible with the corresponding VNIC.

Accordingly, at block 806 the LACP protocol stack 738 monitors the selected VNIC for a response to the transmitted discovery LACP PDU. Unless the link aggregation controller 740 is inoperative or disabled or there is an error in the connection between the fabric interface device 406 and the network node 704, the link aggregation controller 740 is configured to reply with a symmetrical reply link aggregation message by default. Accordingly, the link aggregation controller 740 transmits the reply link aggregation message, and in response to receiving this reply link aggregation message that reflects a compatible link aggregation capability, the LACP protocol stack 738 marks the VNIC link as aggregateable at block 808. However, if the link aggregation controller 740 is prevented from transmitting a reply link aggregation message for some reason, after a certain time has lapsed, the LACP protocol stack 738 concludes that there is not a partner device at the other end of the VNIC link and thus marks the VNIC link as non-aggregateable at block 810. After determining whether the selected VNIC link is aggregateable, the LACP protocol stack 738 determines whether all of the links of interest have been tested at block 812, and if not, selects the next VNIC and the process represented by blocks 804, 806, 808, and 810 is repeated for the next selected VNIC link.

In response to determining, at block 812, that all of the VNIC links have been tested, at block 814 the LACP protocol stack 738 initiates the formation of the LAG 746 from the aggregateable VNIC links. In accordance with LACP, this process includes negotiation of the links to be included in the LAG 746 and then signaling that each peer is ready to start communicating packages over the LAG 746. For the negotiation process, the LACP protocol stack 738 identifies candidate links for the LAG 746 and then transmits a representation of the selected candidate links in negotiation link aggregation messages. The link aggregation controller 740 receives these link aggregation messages and responds in kind with symmetric reply link aggregation message that propose the same links for the LAG 746. Both the LACP protocol stack 738 and the link aggregation controller 740 transmit another negotiation link aggregation message indicating readiness to begin using the identified links as the LAG 746.

With the LAG 746 configured, at block 816 the LACP protocol stack 738 operates to transmit and receive packets over the LAG 746. As part of the LAG transmission process, the LACP protocol stack 738 distributes packets to be transmitted over the LAG 746 among the various VNIC links. Any of a variety of distribution algorithms may be used, such as hashing functions based on source and destination addresses. Incoming packets are likewise logically distributed among the various VNIC links by the network node 704, and thus the LACP protocol stack 738 collects the various packets into their respective packet flows and routes the packet flows to the higher-level protocol stack at the compute node 702 as appropriate.

Moreover, as LACP and other link aggregation protocols often rely on a time-out mechanism to monitor the status of the links of a LAG, the LACP protocol stack 738 also operates to periodically transmit keep-alive link aggregation messages packets over the VNIC links to signal its intention to maintain the VNIC links in the LAG 746. Likewise, the LACP protocol stack 738 monitors for incoming keep-alive link aggregation messages from the emulated partners 741-744 in order to maintain the VNIC links in the LAG 746.

As the LAG 746 is formed from VNICs that are logical emulations of physical NICs, the transmission and reception of packets over the LAG 746 is a logical operation. At the physical level, the fabric interface device 406 collects the outgoing packets and transmits them over a single physical link. Accordingly, while distribution/transmission and receipt/collection of packets over the VNICs appears to the LACP protocol stack 748 as occurring over physically separate links, in the underlying physical implementation, the fabric interface device 406 collates outgoing packets into a single packet stream transmitted over a single physical link to the fabric interconnect 112 for routing to the network node 704. Likewise, packets transmitted to the compute node 702 from the network node 704 in association with the LAG 746 are received at the fabric interface device 406 as a single collective packet stream. The fabric interface device 406 then logically parses the collective packet stream into individual packet streams for each VNIC. In this manner, the fabric interface device 406 and the link aggregation controller 740 can cooperate to transparently provide logical link bundling and the associated messaging needed to establish and maintain the link bundling without providing separate physical links for each represented link in the LAG 746.

Figure 9:
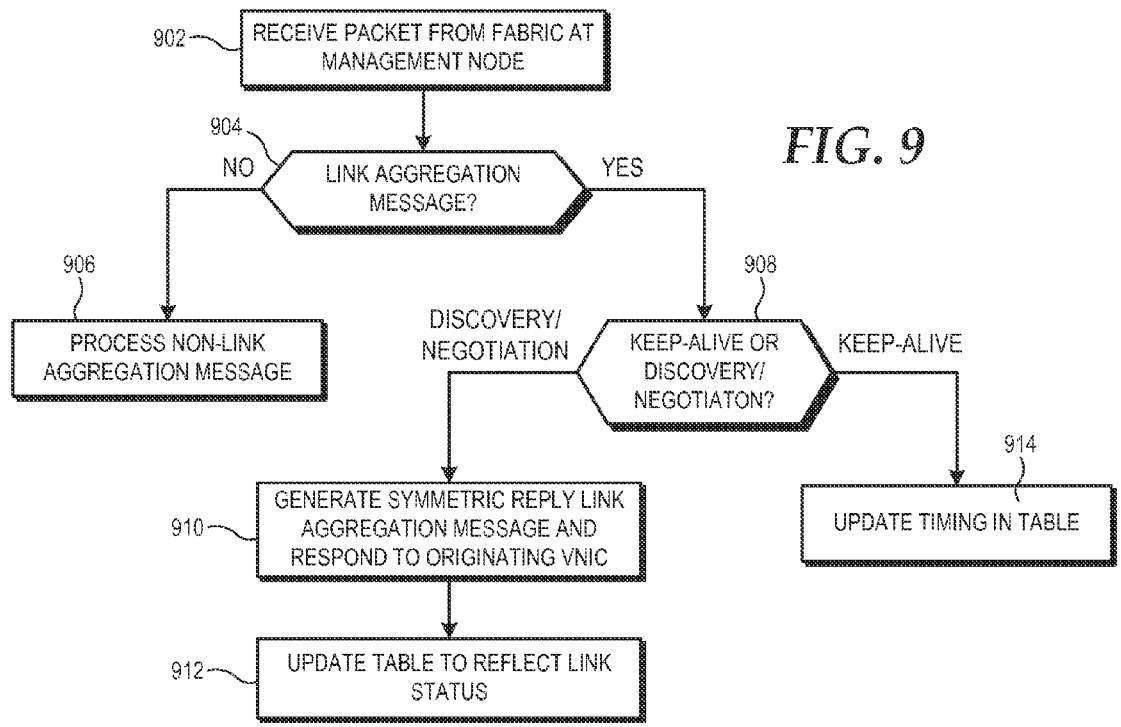
FIG. 9 is a diagram illustrating an example method for supporting link aggregation at a network node of a cluster compute server in accordance with some embodiments.

FIG. 9 illustrates a method 900 for emulating link aggregation partners for establishing a LAG with one or more VNICs instantiated at a compute node of the server 100 in accordance with some embodiments. For purposes of illustration, the method 900 is described in the example context of the compute node 702 and network node 704 of FIG. 7. As noted above, the network node 702 operates as the edge device connecting the nodes of the server 100 to one or more external networks, such as the data center network 114. In operation, the fabric interfaces of the nodes cooperate with the NPU 518 to emulate one or more VNICs at each of the nodes, where the VNICs are virtualized representations of the NIC 501. Accordingly, all outbound packets from the VNICs of the compute nodes associated with the network node 704 are routed via the fabric interconnect 112 to the corresponding ports of the NIC 519 of the network node 704. Conversely, all inbound packets destined for the VNICs of the compute nodes associated with the network node 704 are received at the NIC 501 and then routed to the compute nodes in association with the corresponding VNICs. The method 900 illustrates the process for processing these packets and responding to LACP-related packets accordingly.

At block 902, a packet is received at the NIC 519 from a VNIC instantiated at a compute node (e.g., compute node 702). The NPU 518 processes the packet according to its type at block 904. If the received packet is not a link aggregation message (e.g., not a LACP PDU), the NPU 518 processes the packet as a normal (non-LACP) packet at block 906, such as by retransmitting the packet (with appropriate switch out of source addresses) to the next hop on its routing path via the NIC 501. LACP provides that LACP PDU packets be addressed to a specified multicast address. Accordingly, if the NPU 518 detects that the destination address of the received packet is this LACP multicast address (that is, detects that the packet is a LACP PDU or other type of link aggregation message), the NPU 518 forwards the link aggregation message to the management processor 502 executing the link aggregation controller 740.

At block 906, the link aggregation controller 740 determines the type of link aggregation message received. As noted above, the types of link aggregation messages can include discovery link aggregation messages used to discover LACP-enabled partners, negotiation link aggregation messages used to establish a LAG from links identified as aggregateable, and maintenance, or "keep alive", link aggregation messages used to maintain a link in a LAG. In the event that the received link aggregation message is a discovery-type or negotiation-type link aggregation messages, at block 908 the link aggregation controller 740 generates a symmetric reply link aggregation message and transmits the reply link aggregation message back to the originating VNIC (via the routing path 706).

In order for a link to be aggregateable in accordance with LACP, the NICs at both sides of the link should have compatible physical layer characteristics (e.g., data rate, duplexity, and point-to-point or shared physical medium). Accordingly, for a discovery link aggregation message, the corresponding symmetric reply link aggregation message reflects the same or compatible physical layer characteristics presented in the discovery link aggregation message (including identifying the medium as "point-to-point"), thereby indicating to the LACP protocol stack 738 at the compute node 702 that the VNIC link is aggregateable. In LACP, the actor info state, which represents the physical layer characteristics of the actor (i.e., the VNIC) transmitting the discovery LACP PDU among other data, are represented in the LACP PDU together as an integer operational key, and thus the link aggregation controller 740 may format the reply LACP PDU with the same operational key or an otherwise compatible key.

In the typical LACP LAG negotiation process, each side determines which aggregateable links are to be bonded into a LAG and then transmits a negotiation LACP PDU with a representation of this understanding to its peer. If both sides have the same understanding, the LAG is formed and each side can signal to its peer that it is ready to begin using the LAG so formed. Accordingly, if the VNIC-originated link aggregation message is a negotiation link aggregation message that includes a representation of the VNIC's understanding of the constitution of the LAG 746, the symmetric reply link aggregation message from the link aggregation controller 740 can include a reflection of the same LAG understanding presented in the received link aggregation message. If the VNIC-originated link aggregation message is a negotiation link aggregation message that includes a signal from the VNIC that it is ready to start using the LAG 746, the symmetric reply link aggregation message from the link aggregation controller 740 can include a signal to indicate that the corresponding emulated link aggregation partner is ready to use the LAG 746 as well.

At block 910, the link aggregation controller 740 updates the link state table 750 to reflect the exchange of link aggregation messages between the VNIC and the emulated link aggregation partner presented by the link aggregation controller 740. To illustrate, if the exchange was an exchange of discovery link aggregation messages, the link aggregation controller 740 updates the status field of the table entry for the VNIC to "sync" to indicate that the VNIC link is being considered for aggregation, and in response to a link aggregation message from the VNIC indicating that the link is understood to be part of a LAG, updating the status field to "bonded" to indicated that the VNIC is now part of a LAG and updating the LAG ID field to reflect the LAG ID of the LAG.

Returning to block 906, in the event that the VNIC-originated link aggregation message is a keep-alive link aggregation message, at block 912 the link aggregation controller 740 updates the timing information in the corresponding entry of the link state table 750 to reset the timer used to track periodic receipt of keep-alive link aggregation message packets from the VNICs bonded in a corresponding LAG.

Figure 10:
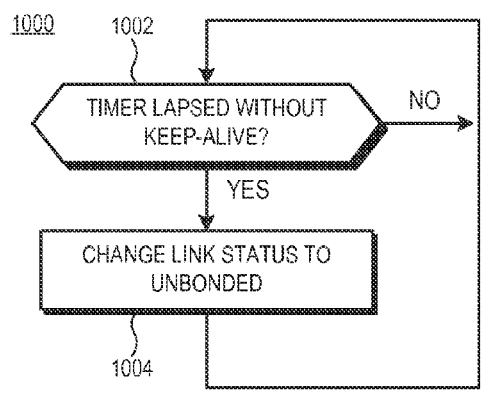
FIG. 10 is a diagram illustrating an example method for monitoring an aggregated link for deaggregation in accordance with some embodiments.
Figure 11:
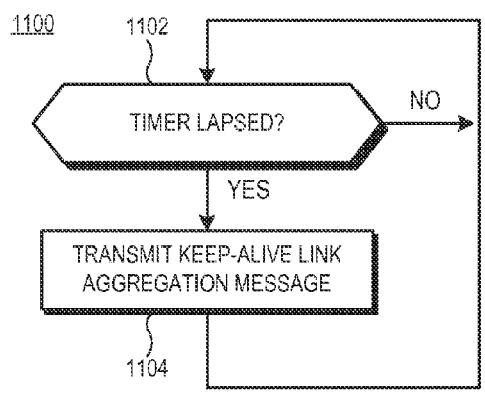
FIG. 11 is a diagram illustrating an example method for maintaining an aggregated link in accordance with some embodiments.

FIGS. 10 and 11 illustrate methods 1000 and 1100, respectively, employed by the link aggregation controller 740 to participate in link maintenance for VNIC links in a LAG in accordance with some embodiments. LACP provides a keep-alive mechanism whereby each end of a link is to periodically transmit a keep-alive link aggregation message to its peer so as to indicate to its peer that it intends to keep the link bonded in the LAG. If a keep-alive link aggregation message is not received from the peer within a specified period of time, the device interprets the absence of the keep-alive link aggregation as the peer's intent to cease using the link in the LAG (or the peer's inability to use the link in the LAG), in response to which the device removes the link from the LAG. The LACP protocol provides for two period intervals in this respect: a fast interval (one keep-alive link aggregation message every second) and a slow interval (one keep-alive link aggregation message every 30 seconds). The particular interval used for the LAG can be specified in the discovery link aggregation messages from the LACP protocol stack 738 and reflected back in the reply link aggregation messages from the link aggregation controller 740. The link aggregation controller 740 employs methods 1000 and 1100 to emulate this link maintenance process. The LACP protocol stack 738 can implement similar methods for its VNICs at the compute node 702.

The method 1000 of FIG. 10 represents the process of monitoring for keep-alive link aggregation messages from a corresponding VNIC in an aggregated link of the LAG 746 (FIG. 7). At block 1002, the link aggregation controller 740 resets a countdown timer that represents the corresponding keep-alive interval plus a sufficient margin for error (e.g., 2 seconds for the fast mode, 40 seconds for the slow mode) for the VNIC and then monitors for a keep-alive link aggregation message originating from the VNIC. The countdown timer can be implemented as a software timer using the corresponding timer entry of the link state table 750, or as a hardware counter that is decremented every cycle of a supplied clock. If the countdown timer lapses without receipt of a keep-alive link aggregation message from the VNIC in the interim, at block 1004 the link aggregation controller 740 notes the VNIC link as unbonded by changing the status field of the corresponding entry of the link state table 750 to "unbonded." However, if a keep-alive link aggregation message is received before the countdown timer lapses, the method 1000 returns to block 1002, whereby the countdown timer is reset and the process repeats for the next monitored interval. Moreover, the link aggregation controller 740 performs this process in parallel for each VNIC link identified as "bonded" by the link state table 750. In this manner, the link aggregation controller 740 follows the lead set by the LACP protocol stack 738 of the compute node in which VNIC links are to be maintained in the corresponding LAG.

The method 1100 of FIG. 11 represents the process of periodically providing keep-alive link aggregation messages to the VNICs of bonded links of the LAG 746 so as to permit the LACP protocol stack 738 to maintain the bonded links in the LAG 746 as long as it needs. At block 1102, the link aggregation controller 740 resets a countdown timer representing the keep-alive interval for the indicated mode (e.g., 1 second for fast mode, 30 seconds for slow mode). As with the countdown timer of method 1000, this countdown timer may be implemented as a software timer using the timer field of the corresponding entry of the link state table 750, or as a hardware timer. In response to a lapse of the countdown timer, at block 1104 the link aggregation controller 740 generates a keep-alive link aggregation message and transmits it to the LACP protocol stack 738 via the corresponding VNIC. The process of method 1100 is repeated in parallel by the link aggregation controller 740 for each VNIC link identified as bonded in the link state table 750. In this manner, the link aggregation controller 740 provides the periodic keep-alive signaling expected by the LACP protocol stack 738 from the emulated link aggregation partners 741-744 in order to maintain the bonded links in the LAG 746.

Figure 12:
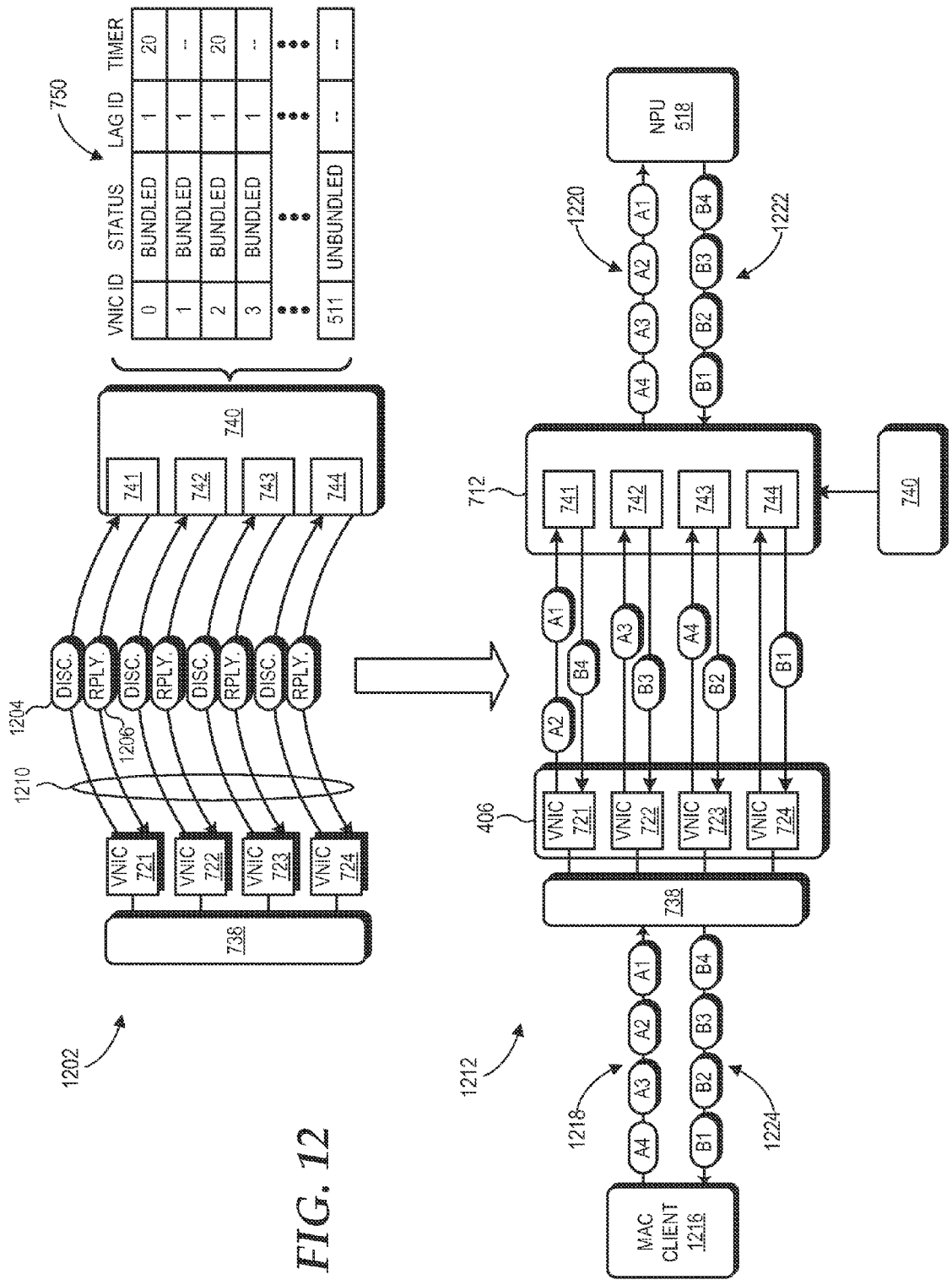
FIG. 12 is a diagram illustrating an example process for establishing a link aggregation group in a cluster compute server using virtual network interface controller resources in accordance with some embodiments.

FIG. 12 illustrates an example operation of the LACP partner emulation process described above in accordance with the methods 800, 900, 1000, and 1100 of FIGS. 9, 9, 10, and 11, respectively. For ease of illustration, operation is described in the example context of FIG. 7 whereby the link aggregation controller 740 of the network node 704 emulates LACP link aggregation partners 741-744 for the VNICs 721-724, respectively, of the compute node 702. As depicted by view 1202, the LACP protocol stack 738 initiates link aggregation of the VNICS 714 by transmitting a discovery link aggregation message 1204 (also denoted as "DISC." in FIG. 12) via each of the VNICs 721-724. Each discovery link aggregation message 1204 includes the MAC address of the corresponding VNIC as the source address, as well as other information including a system ID assigned by the LACP protocol stack 738 and an operational key representing the "physical" layer characteristics presented by the VNIC. The discovery link aggregation message 1204 is a multicast packet that the fabric 122 (FIG. 1) is configured to route to the network node 704, which in turn forwards the discovery link aggregation message 1204 to the other network nodes in the server 100. At the network node 704, the discovery link aggregation message 1204 is routed to the link aggregation controller 740, which in turn generates a reply link aggregation message 1206 (also denoted "RPLY." in FIG. 7) which contains information symmetric to, or compatible with, the information presented in the discovery link aggregation message 1204 (e.g., with a compatible operational key indicating compatible physical layer characteristics) and transmits the reply link aggregation message 1206 to the originating VNIC. This process is performed for each of the VNICs 721-724. Negotiation link aggregation messages are also exchanged between the LACP protocol stack 738 and the link aggregation controller 740 in a similar manner to establish the VNICs 721-724 as bundled or aggregated links of a LAG 1210 (corresponding to LAG 746 of FIG. 7).

View 1202 of FIG. 12 also illustrates the state of the entries of the link state table 750 upon conclusion of the link aggregation phase. As shown, the link aggregation controller 740 has marked each of the VNICs 721-724 (having VNIC IDs 0-3, respectively), as currently in a "bundled" state and having a LAG ID of 1, thereby reflecting that the VNICs 721-724 presently are bundled links in a single LAG.

View 1212 of FIG. 12 depicts the operation of the compute node 702 and the network node 704 with respect to the established LAG 1210. In accordance with link aggregation convention, the LAG 1210 appears to a MAC client 1216 of the compute node 702 (e.g., the higher-level protocol stack 734) as a single physical link. Accordingly, the MAC client 1216 provides a packet stream 1218 to the LAG 1210 for transmission as it would for a typical physical link. The LACP protocol stack 738 distributes the packets of the packet stream 1218 among the various VNICs 721-724 in accordance with a distribution algorithm, such as a load balancing algorithm or a hash of the source and destination addresses of the packets. Typically, the distribution is modulated to ensure that conversations are maintained on the same VNIC link in order to ensure that the packets of the conversation are not received out of order. In the depicted example, packets A1 and A2 are distributed to the VNIC 721, packet A3 is distributed to the VNIC 722, and packet A4 is distributed to VNIC 723.

To the LACP protocol stack 738, it appears that the VNICs 721-724 are physical NICs connected over corresponding physical links to link aggregation partners 741-744, respectively. However, as the VNICs 721-724 are virtualized NICs emulated by the fabric interface device 406 and the link aggregation partners 741-744 are emulated by the link aggregation controller 740 using the techniques described above, the distribution of the packets over the VNICs is a logical distribution only—the packets of the stream 1218 are transmitted over the same single physical link and routing path connecting the fabric interface device 406 of the compute node 702 to the port 712 of the NIC 519 (FIG. 7) of the network node 704. Accordingly, the link aggregation controller 740 coordinates with the port 712 and the NIC 519 to collect the distributed packets back into a packet stream 1220, which is provided to the NPU 518 for further processing (e.g., for transmission to an external network via the NIC 501 as referenced above in FIG. 7).

A packet stream 1222 received at the NPU 518 and destined for the compute node 702 is routed to the NIC 519 (FIG. 7). The link aggregation controller 740 coordinates with the NIC 519 to logically distribute the packets of the packet stream 1222 among the VNICs 721-724 as destination NICs for the packets. The distribution algorithm can include the same algorithm implemented by the LACP protocol stack 738 or a different distribution algorithm. In the example of FIG. 12, packet B1 is distributed to the VNIC 724, packet B2 is distributed to the VNIC 723, packet B3 is distributed to the VNIC 722, and packet B4 is distributed to the VNIC 721. As above, the VNICs 721-724 are virtual emulations presented to the compute node 702 as local physical NICS, and thus the distribution of the packets of the packet stream 1222 is a logical construct. The packets of the packet stream 122 are physically transmitted as a single stream over a single physical link connecting the port 712 of the NIC 519 to the fabric interface device 406 of the compute node 702. At the fabric interface device 406, the received packets from the packet stream 1222 are presented to the LACP protocol stack 738 through the corresponding VNICs 721-724, and the LACP protocol stack 738 then provides the packets as a single packet stream 1224 to the MAC client 1216.

As FIG. 12 illustrates, the link aggregation partner emulation provided by the link aggregation controller 740 at the network node 704 obscures the fact that the VNICs 721-724 are not in fact local physical NIC resources and thus enables the LACP protocol stack 738 to construct an apparent LAG for use by the MAC client 1216 in a way that is transparent to the MAC client 1216 and the LACP protocol stack 738. Thus, "off the shelf" or other standardized LACP-based software can be implemented at the compute nodes of the server 100 without modification to account for the particular virtualized peripheral resource architecture of the server 100.

Figure 13:
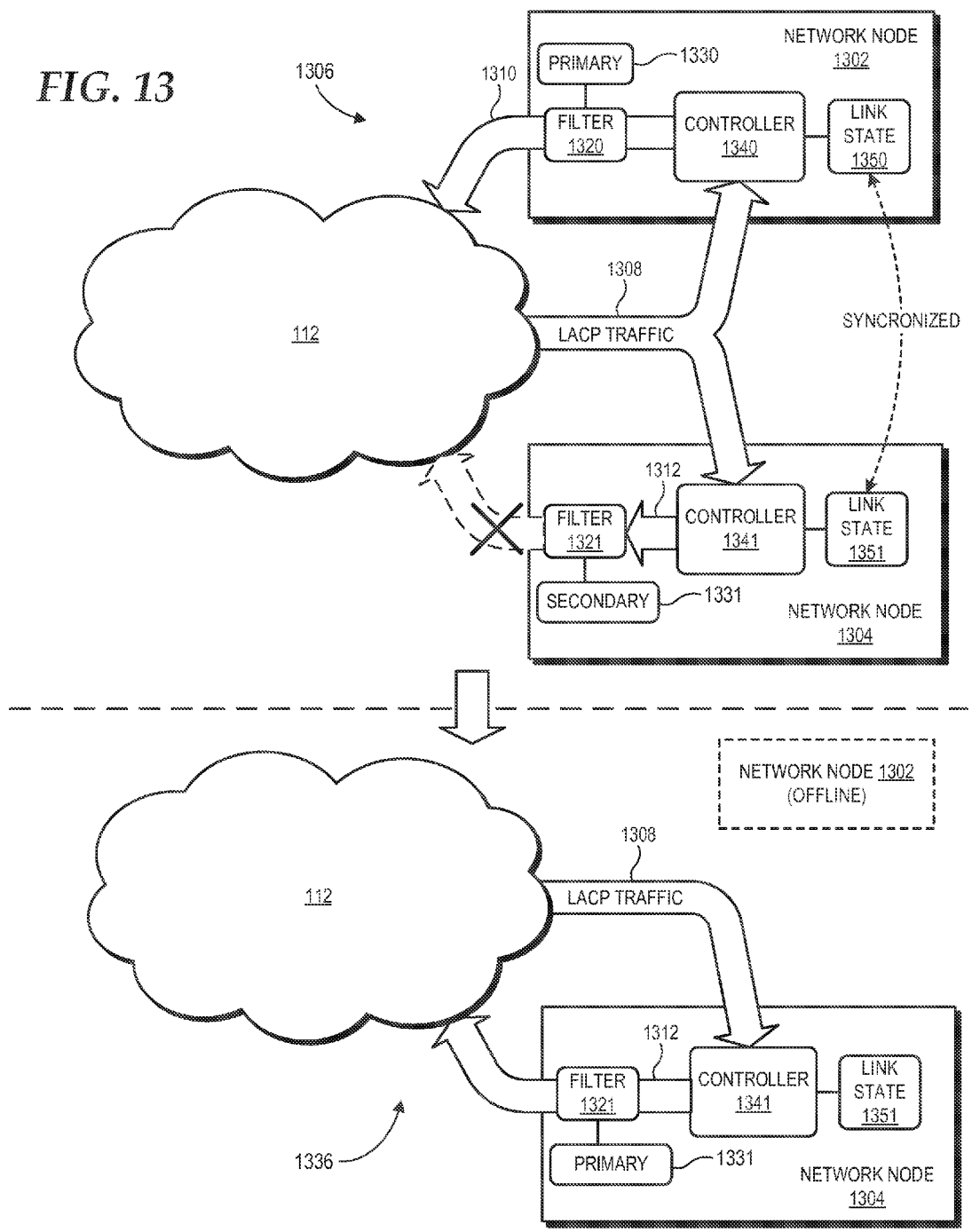
FIG. 13 is a diagram illustrating an example process for providing fail-over/switch-over resiliency for link aggregation configurations in a cluster compute server in accordance with some embodiments.

FIG. 13 illustrates an example technique for providing fail-over or hot-swap resiliency for LACP emulation in the server 100 in accordance with some embodiments. As described above, the server 100 implements one or more network nodes to provide external network interface services for the compute nodes of the server, whereby each network node is assigned to service a subset of the compute nodes. As also described above, each network node implements a link aggregation controller to provide link aggregation partner emulation for the VNICs implemented at the computer nodes of the associated subset. As part of this LACP emulation, the link aggregation controller maintains a link state table that reflects the current link state (e.g., unbundled, bundled, undergoing synchronization) of the VNICs and which is used to set up and maintain link aggregations in coordination with the LACP protocol stacks of the compute nodes.

Although this approach facilitates seamless implementation of standard LACP-based software at the compute nodes, a reliance on a single network node may make this approach susceptible to significant disruption in the event of a failure of the network node or in the event that there is a need to swap out the network node. In either event, the LACP states of the links would be lost and thus the LACP protocol stacks would have to resort to tearing down the LAGs and attempting to reconstruct new LAGs when a new network node is brought online.

To avoid interruption of network services, including LACP link partner emulation services, the server 100 can implement a backup scheme whereby network nodes are combined in pairs, with each pair of network nodes including a primary network node and a secondary network node. The primary network node operates to provide network services for the associated subset of compute nodes, and the secondary network node operates in a standby mode in preparation to take over for the primary network node in the event of a failure or swap-out of the primary network node. In some embodiments, the server 100 can leverage this primary/secondary network node configuration to duplicate, at the secondary network node, the link state information maintained at primary network node such that if the primary network node fails or is swapped out, the secondary network node can take the place of the primary network node without loss of the link aggregation states and thus maintain the LAGs setup by the compute nodes.

To illustrate, view 1306 of FIG. 13 depicts an example whereby the server 100 includes network nodes 1302 and 1304 (corresponding to the network node 704 of FIG. 7) connected to the fabric interconnect 112. The network node 1302 implements a link aggregation controller 1340 and a link state table 1350 (corresponding to the link aggregation controller 740 and link state table 750 of FIG. 7. Likewise, the network node 1304 implements a link aggregation controller 1341 and a link state table 1351. In view 1306, the network node 1302 is designated as the primary network node and the network node 1304 is designated as the secondary network node.

As noted above, link aggregation messages are effectively "multicast" in the server 100 by unicasting the link aggregation messages to a corresponding network node, which in turn forwards the link aggregation messages to the other network nodes in the server 100. Thus all LACP traffic 1308 is provided to both of the network nodes 1302 and 1304. The link aggregation controller 1340 of the network node 1302 responds to the LACP traffic 1308 with response LACP traffic 1310, which includes reply link aggregation messages generated in response to discovery or negotiation link aggregation messages from the compute nodes, as described above. The LACP traffic 1308 also includes keep-alive link aggregation messages generated for the various VNIC links identified as bonded by the link state table 1350 as described above. In the processes described above, the link aggregation controller 1340 updates the link state table 350 in response to the link state changes reflected in the incoming LACP traffic 1308 and the outgoing LACP traffic 1310. In parallel, the link aggregation controller 1341 of the network node 1302 operates in the same manner by responding to the LACP traffic 1308 by generating response LACP traffic 1312 that includes reply link aggregation messages and keep-alive link aggregation messages for VNIC links identified as bonded by the link state table 1351 maintained by the link aggregation controller 1341.

It will be appreciated that if the generated reply and keep-alive link aggregation messages from both network nodes 1302 and 1304 are transmitted to the compute nodes, the compute nodes will receive duplicate link aggregation messaging. Accordingly, to prevent duplicate outgoing LACP traffic, the network nodes 1302 and 1304 employ packet filters 1320 and 1321, respectively, that filter outgoing link aggregation messaging depending on whether the corresponding network node is has primary status or secondary status. As the network node 1302 is the primary node (as indicated by a value stored at a state element 1330 (e.g., a state register) of the network node 1302), the filter 1320 permits all outgoing link aggregation messages of the LACP traffic 1310 to output to the fabric interconnect 112. However, because the network node 1304 is a secondary node at this point (as indicated by a value stored at a state element 1331 of the network node 1304), the filter 1321 prevents the outgoing LACP PDUs of the outgoing LACP traffic 1312 from reaching the fabric interconnect 112. The filters 1320 and 1321 may operate by selectively dropping link aggregation messages at the PHY level, or by preventing formation of the link aggregation messages at the data link layer in a manner that is transparent to the link aggregation controllers.

As the link aggregation controllers 1340 and 1341 are processing the same incoming LACP traffic 1308 and producing the same outgoing LACP traffic (that is, outgoing LACP traffic 1310 and outgoing LACP traffic 1312 are substantially similar) and as the link aggregation controllers 1340 and 1341 are updating their respective link state tables based on the same incoming and outgoing LACP traffic, at any given point in time the link state information in the link state table 1350 and the link state information in the link state table 1351 should be the same (that is, reflect the same state information for each VNIC). As such, by having both network nodes 1302 and 1304 process the LACP traffic 1308 in parallel, each of the network nodes 1302 and 1304 has the same link aggregation partner emulation information. Accordingly, as illustrated by view 1336 of FIG. 13, in the event that the network node 1302 goes offline due to a failure or hot-swap, the network node 1304 is switched to the primary network node and its state element 1331 is updated to reflect this secondary-to-primary status switch. With the network node 1304 now designated as the primary network node, the filter 1321 stops dropping the outgoing link aggregation messages of the outgoing LACP traffic 1312 generated by the link aggregation controller 1341. Thus, the outgoing link aggregation messages generated by the link aggregation controller 1341 are transmitted to the compute nodes in place of the LACP traffic 1310 that would have been generated and transmitted by the link aggregation controller 1341. However, as the link state table 1351 accurately reflects the current link states at this point due to the parallel operation of the network node 1304, the link aggregation controller 1341 is able to continue the LACP link partner emulation process at the point where the link aggregation controller 1340 left off. As such, the link aggregation controller 1341 is able to maintain current LACP emulation and thus prevent the LAGs presently maintained by the compute nodes from being disbanded.

Moreover, to provide redundancy for the network node 1304, another network node with a link aggregation controller may be introduced to the server 100, and this network node may operate as the secondary node in the same manner described above and thus be in a position to take over LACP emulation duties using its own up-to-date link state table in the event that the network node 1304 is taken offline.

In some embodiments, at least some of the functionality described above may be implemented by one or more processors executing one or more software programs tangibly stored at a computer readable medium, and whereby the one or more software programs comprise instructions that, when executed, manipulate the one or more processors to perform one or more functions described above. In some embodiments, the components and techniques described above are implemented in a system comprising one or more integrated circuit (IC) devices (also referred to as integrated circuit packages or microchips. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Figure 14:
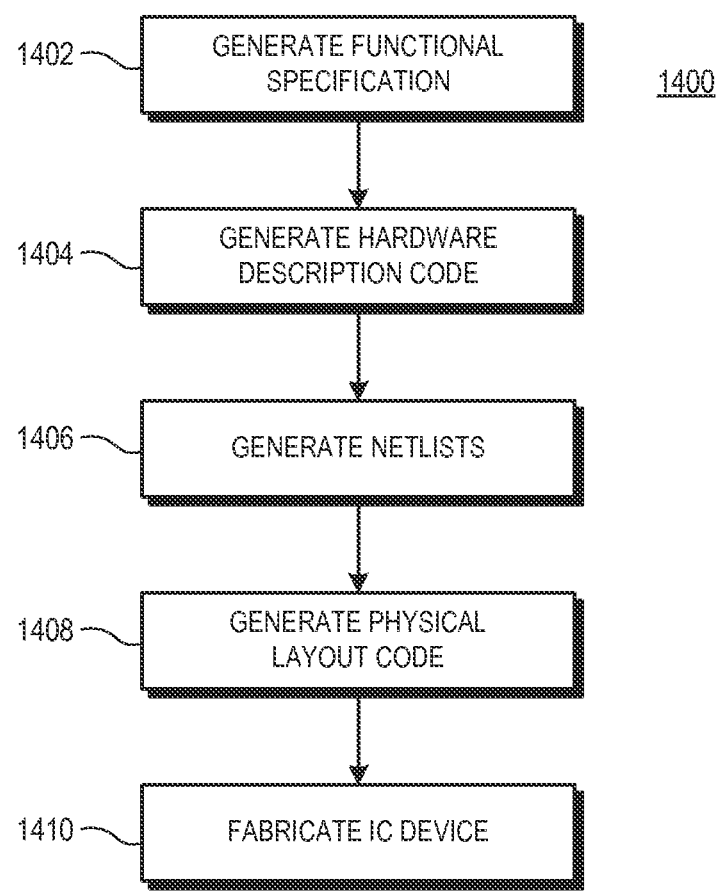
FIG. 14 is a flow diagram illustrating a method for designing and fabricating an integrated circuit (IC) device in accordance with some embodiments.

FIG. 14 is a flow diagram illustrating an example method 1400 for the design and fabrication of an IC device implementing one or more aspects. As noted above, the code generated for each of the following processes is stored or otherwise embodied in computer readable storage media for access and use by the corresponding design tool or fabrication tool.

At block 1402 a functional specification for the IC device is generated. The functional specification (often referred to as a micro architecture specification (MAS)) may be represented by any of a variety of programming languages or modeling languages, including C, C++, SystemC, Simulink™, or MATLAB™.

At block 1404, the functional specification is used to generate hardware description code representative of the hardware of the IC device. In at some embodiments, the hardware description code is represented using at least one Hardware Description Language (HDL), which comprises any of a variety of computer languages, specification languages, or modeling languages for the formal description and design of the circuits of the IC device. The generated HDL code typically represents the operation of the circuits of the IC device, the design and organization of the circuits, and tests to verify correct operation of the IC device through simulation. Examples of HDL include Analog HDL (AHDL), Verilog HDL, SystemVerilog HDL, and VHDL. For IC devices implementing synchronized digital circuits, the hardware descriptor code may include register transfer level (RTL) code to provide an abstract representation of the operations of the synchronous digital circuits. For other types of circuitry, the hardware descriptor code may include behavior-level code to provide an abstract representation of the circuitry's operation. The HDL model represented by the hardware description code typically is subjected to one or more rounds of simulation and debugging to pass design verification.

After verifying the design represented by the hardware description code, at block 1406 a synthesis tool is used to synthesize the hardware description code to generate code representing or defining an initial physical implementation of the circuitry of the IC device. In some embodiments, the synthesis tool generates one or more netlists comprising circuit device instances (e.g., gates, transistors, resistors, capacitors, inductors, diodes, etc.) and the nets, or connections, between the circuit device instances. Alternatively, all or a portion of a netlist can be generated manually without the use of a synthesis tool. As with the hardware description code, the netlists may be subjected to one or more test and verification processes before a final set of one or more netlists is generated.

Alternatively, a schematic editor tool can be used to draft a schematic of circuitry of the IC device and a schematic capture tool then may be used to capture the resulting circuit diagram and to generate one or more netlists (stored on a computer readable media) representing the components and connectivity of the circuit diagram. The captured circuit diagram may then be subjected to one or more rounds of simulation for testing and verification.

At block 1408, one or more EDA tools use the netlists produced at block 1406 to generate code representing the physical layout of the circuitry of the IC device. This process can include, for example, a placement tool using the netlists to determine or fix the location of each element of the circuitry of the IC device. Further, a routing tool builds on the placement process to add and route the wires needed to connect the circuit elements in accordance with the netlist(s). The resulting code represents a three-dimensional model of the IC device. The code may be represented in a database file format, such as, for example, the Graphic Database System II (GDSII) format. Data in this format typically represents geometric shapes, text labels, and other information about the circuit layout in hierarchical form.

At block 1410, the physical layout code (e.g., GDSII code) is provided to a manufacturing facility, which uses the physical layout code to configure or otherwise adapt fabrication tools of the manufacturing facility (e.g., through mask works) to fabricate the IC device. That is, the physical layout code may be programmed into one or more computer systems, which may then control, in whole or part, the operation of the tools of the manufacturing facility or the manufacturing operations performed therein.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A cluster compute server comprising:
    a fabric interconnect;
    a first node coupled to the fabric interconnect and comprising a network interface controller coupleable to an external network;
    a second node coupled to the fabric interconnect and comprising a fabric interface to provide a set of one or more virtual network interface controllers representing the network interface controller of the first node, the one or more virtual network interface controllers each appearing as a local network interface controller to software executed at the second node;
    wherein the first node is to emulate one or more link aggregation partners for the set of one or more virtual network interface controllers by transmitting a reply link aggregation message to the virtual network interface controller in response to a link aggregation message received from the virtual network interface controller and by periodically transmitting link aggregation messages to the virtual network interface controller; and
    wherein in response to aggregating a corresponding virtual network interface controller into a link aggregation group, the second node is to periodically transmit link aggregation messages to the first node via the virtual network interface controller to signal an intent to maintain the virtual network interface controller in the link aggregation group.

2. The cluster compute server of claim 1, wherein the link aggregation message received from the virtual network interface controller is a discovery link aggregation message and the reply link aggregation message represents that the emulated link aggregation partner is aggregateable.

3. The cluster compute server of claim 1, wherein the first node is to maintain a link state table identifying a link aggregation state for each virtual network interface controller of the set, the link aggregation state identifying whether the corresponding virtual network interface controller is in a link aggregation group configured by the second node.

4. The cluster compute server of claim 3, wherein the first node is to update the link state table responsive to link aggregation messaging between the first node and the second node.

5. The cluster compute server of claim 1, wherein the first node is to maintain a link state table responsive to link aggregation messaging communicated between the first node and the second node, the link state table indicating an aggregation state for each virtual network interface controller of the set.

6. The cluster compute server of claim 1, wherein the fabric interconnect implements a multiple-hop fixed routing network.

7. The cluster compute server of claim 1, wherein the fabric interconnect connects the first node and the second node via a fixed routing path having at least one intermediate node.

8. A field replaceable unit (FRU) comprising:
a printed circuit board (PCB) comprising a socket interface to couple with a socket of a fabric of a network;
a first network interface controller to couple to an external network; and
a link aggregation controller to emulate a link aggregation partner for each of one or more virtual network interface controllers at a node of the network, the one or more virtual network interface controllers representing the first network interface controller as a local network interface controller at the node wherein the link aggregation controller is to emulate a link aggregation partner for a corresponding virtual network interface controller of the node by transmitting a reply link aggregation message to the corresponding virtual network interface controller in response to a link aggregation message received from the virtual network interface controller and by periodically transmitting link aggregation messages to the virtual network interface controller responsive to the node signaling an aggregation of the virtual network interface controller into a link aggregation group.

9. The FRU of claim 8, wherein the link aggregation controller is to identify the virtual network interface controller as continuing to be aggregated in the link aggregation group responsive to a state of a countdown timer, and wherein the link aggregation controller is to reset the countdown timer in response to link aggregation messages received from the virtual network interface controller.

10. The FRU of claim 8, wherein the link aggregation controller is to maintain a link state table responsive to link aggregation messaging communicated between the FRU and the node, the link state table indicating a link aggregation state for each virtual network interface controller.

11. The FRU of claim 8, wherein the fabric connects the FRU and the node via a fixed routing path having at least one intermediate node.

12. A method comprising:
aggregating one or more virtual network interface controllers at a first node of a cluster compute server to form a link aggregation group, wherein each of the virtual network interface controllers represents a network interface controller of a second node of the cluster compute server, and each of the virtual network interface controllers appears as a local network interface controller to software executed at the first node; and
emulating, at the second node, a link aggregation partner for each of the virtual network interface controllers of the link aggregation group by transmitting a reply link aggregation message to the virtual network interface controller in response to a link aggregation message received from the virtual network interface;
in response to aggregating a corresponding virtual network interface controller into a link aggregation group, periodically transmitting link aggregation messages from the virtual network interface controller to signal an intent to maintain the virtual network interface controller in the link aggregation group; and
wherein emulating the link aggregation partner for the corresponding virtual network interface controller further comprises periodically transmitting link aggregation messages from the second node to the corresponding virtual network interface controller.

13. The method of claim 12, wherein the link aggregation message received from the virtual network interface controller is a discovery link aggregation message and the reply link aggregation message represents that a corresponding emulated link aggregation partner is aggregateable.

14. The method of claim 12, further comprising:
maintaining, at the second node, a link state table responsive to link aggregation messaging communicated between the first node and the second node, the link state table indicating a link aggregation state for each of the one or more virtual network interface controllers.

15. A method comprising:
receiving, at a first node of a cluster compute server, a link aggregation message via a virtual network interface controller at a second node of the cluster compute server, the virtual network interface controller representing a network interface controller of the first node and appearing as a local network interface controller to software executed at the second node, wherein the link aggregation message comprises a keep-alive link aggregation message from the second node;
transmitting a reply link aggregation message from the first node to the second node via the virtual network interface controller;
updating a link state table at the first node to refresh a timer value associated with the virtual network interface controller in response to the keep-alive link aggregation message from the second node; and
periodically transmitting keep-alive link aggregation messages from the first node to the second node via the virtual network interface controller based on the timer value.

16. The method of claim 15, wherein the link aggregation message comprises a discovery link aggregation message and the reply link aggregation message indicates an aggregateable link.

17. The method of claim 15, wherein the link aggregation message comprises a negotiation link aggregation message indicating an understood link membership of a link aggregation group and the reply link aggregation message reflects the understood link membership.

* * * * *